United States Patent
Liao et al.

(10) Patent No.: US 11,496,741 B2
(45) Date of Patent: Nov. 8, 2022

(54) METHODS AND APPARATUSES FOR BLOCK PARTITIONING AT PICTURE BOUNDARY

(71) Applicant: ALIBABA GROUP HOLDING LIMITED, Grand Cayman (KY)

(72) Inventors: Ru-Ling Liao, Beijing (CN); Yan Ye, San Diego, CA (US); Jie Chen, Beijing (CN); Jiancong Luo, Skillman, NJ (US)

(73) Assignee: Atibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/103,144

(22) Filed: Nov. 24, 2020

(65) Prior Publication Data

US 2021/0185321 A1    Jun. 17, 2021

Related U.S. Application Data

(60) Provisional application No. 62/948,856, filed on Dec. 17, 2019.

(51) Int. Cl.
| | |
|---|---|
| *H04N 19/96* | (2014.01) |
| *H04N 19/132* | (2014.01) |
| *H04N 19/119* | (2014.01) |
| *H04N 19/176* | (2014.01) |
| *H04N 19/172* | (2014.01) |

(52) U.S. Cl.
CPC ......... *H04N 19/132* (2014.11); *H04N 19/119* (2014.11); *H04N 19/172* (2014.11); *H04N 19/176* (2014.11)

(58) Field of Classification Search
CPC .. H04N 19/132; H04N 19/119; H04N 19/172; H04N 19/176
See application file for complete search history.

(56) References Cited

U.S. PATENT DOCUMENTS

| | | |
|---|---|---|
| 2013/0272381 A1 | 10/2013 | Guo et al. |
| 2017/0272750 A1 | 9/2017 | An et al. |
| 2017/0280162 A1* | 9/2017 | Zhao .................... H04N 19/103 |

(Continued)

FOREIGN PATENT DOCUMENTS

WO    WO-2019/229169 A1    12/2019

OTHER PUBLICATIONS

PCT International Search Report and Written Opinion dated Feb. 11, 2021 issued in corresponding International Application No. PCT/US2020/061970 (17 pgs.).

(Continued)

*Primary Examiner* — Hesham K Abouzahra
(74) *Attorney, Agent, or Firm* — Finnegan, Henderson, Farabow, Garrett & Dunner, LLP

(57) ABSTRACT

The present disclosure provides video processing method and apparatus. An exemplary method includes: determining whether a coding block comprises samples outside a picture boundary; and in response to the coding block being determined to comprise samples outside a picture boundary, performing quad tree splitting of the coding block regardless of a value of a first parameter, wherein the first parameter indicates whether the quad tree is allowed to be used to split the coding block.

14 Claims, 23 Drawing Sheets

Illustration Of Block Partitioning On Picture Boundaries

(56) References Cited

U.S. PATENT DOCUMENTS

2017/0347128 A1* 11/2017 Panusopone ......... H04N 19/172
2021/0084299 A1* 3/2021 Gao ..................... H04N 19/176

OTHER PUBLICATIONS

"Requirements for a Future Video Coding Standard v5," International Organisation for Standardisation, Torino, IT, 14 pages (2017).
Chen et al., "Algorithm Description of Joint Exploration Test Model 7 (JEM 7)," JVET-G1001-v1, $7^{th}$ Meeting: Torino, IT, Jul. 13-21, 2017, 50 pages.
International Telecommunications Union "Series H: Audiovisual and Multimedia Systems Infrastructure of audiovisual services—Coding of moving video", ITU-T Telecommunication Standardization Sector of ITU, Apr. 2013, 317 pages.
Sullivan et al., "Overview of the High Efficiency Video Coding (HEVC) Standard," IEE Transactions on Circuits and Systems for Video Technology, vol. 22, No. 12, pp. 1649-1668 (2012).

\* cited by examiner

Table 1: MttSplitMode derivation based on multi-tree syntax elements

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

FIG. 7

Examples Of Disallowed TT And BT Partitioning

Illustration Of Block Partitioning On Picture Boundaries

Table 2: Specification of parallelTtSplit and cbSize based on btSplit

|  | btSplit == SPLIT_BT_VER | btSplit == SPLIT_BT_HOR |
|---|---|---|
| parallelTtSplit | SPLIT_TT_VER | SPLIT_TT_HOR |
| cbSize | cbWidth | cbHeight |

FIG. 10

Table 3: Specification of cbSize based on ttSplit

|  | ttSplit == SPLIT_TT_VER | ttSplit == SPLIT_TT_HOR |
|---|---|---|
| cbSize | cbWidth | cbHeight |

FIG. 11

Table 4: Section 7.3.9.4 Coding tree syntax <Part I>

| | Descriptor |
|---|---|
| coding_tree( x0, y0, cbWidth, cbHeight, qgOnY, qgOnC, cbSubdiv, cqtDepth, mttDepth, depthOffset, partIdx, treeTypeCurr, modeTypeCurr ) { | |
| if( ( allowSplitBtVer \|\| allowSplitBtHor \|\| allowSplitTtVer \|\| allowSplitTtHor \|\| allowSplitQT ) &&( x0 + cbWidth <= pic_width_in_luma_samples ) && ( y0 + cbHeight <= pic_height_in_luma_samples ) ) | |
| 1201    *split_cu_flag* | ae(v) |
| if( cu_qp_delta_enabled_flag && qgOnY && cbSubdiv <= CuQpDeltaSubdiv ) { | |
|     IsCuQpDeltaCoded = 0 | |
|     CuQpDeltaVal = 0 | |
|     CuQgTopLeftX = x0 | |
|     CuQgTopLeftY = y0 | |
| } | |
| if( cu_chroma_qp_offset_enabled_flag && qgOnC && cbSubdiv <= CuChromaQpOffsetSubdiv ) | |
|     IsCuChromaQpOffsetCoded = 0 | |
| if( split_cu_flag ) { | |
|    if( ( allowSplitBtVer \|\| allowSplitBtHor \|\| allowSplitTtVer \|\| allowSplitTtHor ) && allowSplitQT ) | |
| 1202      *split_qt_flag* | ae(v) |
|    if( !split_qt_flag ) { | |
|     if( ( allowSplitBtHor \|\| allowSplitTtHor ) && ( allowSplitBtVer \|\| allowSplitTtVer ) ) | |
| 1203      *mtt_split_cu_vertical_flag* | ae(v) |
|     if( ( allowSplitBtVer && allowSplitTtVer && mtt_split_cu_vertical_flag ) \|\| ( allowSplitBtHor && allowSplitTtHor && !mtt_split_cu_vertical_flag ) ) | |
| 1204      *mtt_split_cu_binary_flag* | ae(v) |
| } | |
| if( modeTypeCondition == 1 ) | |
|    modeType = MODE_TYPE_INTRA | |
| else if( modeTypeCondition == 2 ) { | |
|    mode_constraint_flag | ae(v) |
|    modeType = mode_constraint_flag ? MODE_TYPE_INTRA : MODE_TYPE_INTER | |
| } else { | |
|    modeType = modeTypeCurr | |
| } | |

FIG. 12

Table 4: Section 7.3.9.4 Coding tree syntax <Part II>

| |  |
|---|---|
| treeType = ( modeType == MODE_TYPE_INTRA ) ? DUAL_TREE_LUMA : treeTypeCurr | |
| if( !split_qt_flag ) { | |
|   if( MttSplitMode[ x0 ][ y0 ][ mttDepth ] == SPLIT_BT_VER ) { | |
|     depthOffset += ( x0 + cbWidth > pic_width_in_luma_samples ) ? 1 : 0 | |
|     x1 = x0 + ( cbWidth / 2 ) | |
|     coding_tree( x0, y0, cbWidth / 2, cbHeight, qgOnY, qgOnC, cbSubdiv + 1,<br>                    cqtDepth, mttDepth + 1, depthOffset, 0, treeType, modeType ) | |
|     if( x1 < pic_width_in_luma_samples ) | |
|       coding_tree( x1, y0, cbWidth / 2, cbHeightY, qgOnY, qgOnC, cbSubdiv + 1,<br>                      cqtDepth, mttDepth + 1, depthOffset, 1, treeType, modeType ) | |
|   } else if( MttSplitMode[ x0 ][ y0 ][ mttDepth ] == SPLIT_BT_HOR ) { | |
|     depthOffset += ( y0 + cbHeight > pic_height_in_luma_samples ) ? 1 : 0 | |
|     y1 = y0 + ( cbHeight / 2 ) | |
|     coding_tree( x0, y0, cbWidth, cbHeight / 2, qgOnY, qgOnC, cbSubdiv + 1,<br>                    cqtDepth, mttDepth + 1, depthOffset, 0, treeType, modeType ) | |
|     if( y1 < pic_height_in_luma_samples ) | |
|       coding_tree( x0, y1, cbWidth, cbHeight / 2, qgOnY, qgOnC, cbSubdiv + 1,<br>                    cqtDepth, mttDepth + 1, depthOffset, 1, treeType, modeType ) | |
|   } else if( MttSplitMode[ x0 ][ y0 ][ mttDepth ] == SPLIT_TT_VER ) { | |
|     x1 = x0 + ( cbWidth / 4 ) | |
|     x2 = x0 + ( 3 * cbWidth / 4 ) | |
|     qgNextOnY = qgOnY && ( cbSubdiv + 2 <= CuQpDeltaSubdiv ) | |
|     qgNextOnC = qgOnC && ( cbSubdiv + 2 <= CuChromaQpOffsetSubdiv ) | |
|     coding_tree( x0, y0, cbWidth / 4, cbHeight, qgNextOnY, qgNextOnC, cbSubdiv + 2,<br>                    cqtDepth, mttDepth + 1, depthOffset, 0, treeType, modeType ) | |
|     coding_tree( x1, y0, cbWidth / 2, cbHeight, qgNextOnY, qgNextOnC, cbSubdiv + 1,<br>                    cqtDepth, mttDepth + 1, depthOffset, 1, treeType, modeType ) | |
|     coding_tree( x2, y0, cbWidth / 4, cbHeight, qgNextOnY, qgNextOnC, cbSubdiv + 2,<br>                    cqtDepth, mttDepth + 1, depthOffset, 2, treeType, modeType ) | |
|   } else { /* SPLIT_TT_HOR */ | |
|     y1 = y0 + ( cbHeight / 4 ) | |
|     y2 = y0 + ( 3 * cbHeight / 4 ) | |
|     qgNextOnY = qgOnY && ( cbSubdiv + 2 <= CuQpDeltaSubdiv ) | |

FIG. 12 (continued)

Table 4: Section 7.3.9.4 Coding tree syntax <Part III>

| | |
|---|---|
| qgNextOnC = qgOnC && ( cbSubdiv + 2 <= CuChromaQpOffsetSubdiv ) | |
| coding_tree( x0, y0, cbWidth, cbHeight / 4, qgNextOnY, qgNextOnC, cbSubdiv + 2, cqtDepth, mttDepth + 1, depthOffset, 0, treeType, modeType ) | |
| coding_tree( x0, y1, cbWidth, cbHeight / 2, qgNextOnY, qgNextOnC, cbSubdiv + 1, cqtDepth, mttDepth + 1, depthOffset, 1, treeType, modeType ) | |
| coding_tree( x0, y2, cbWidth, cbHeight / 4, qgNextOnY, qgNextOnC, cbSubdiv + 2, cqtDepth, mttDepth + 1, depthOffset, 2, treeType, modeType ) | |
| } | |
| } else { | |
| x1 = x0 + ( cbWidth / 2 ) | |
| y1 = y0 + ( cbHeight / 2 ) | |
| coding_tree( x0, y0, cbWidth / 2, cbHeight / 2, qgOnY, qgOnC, cbSubdiv + 2, cqtDepth + 1, 0, 0, 0, treeType, modeType ) | |
| if( x1 < pic_width_in_luma_samples ) | |
| coding_tree( x1, y0, cbWidth / 2, cbHeight / 2, qgOnY, qgOnC, cbSubdiv + 2, cqtDepth + 1, 0, 0, 1, treeType, modeType ) | |
| if( y1 < pic_height_in_luma_samples ) | |
| coding_tree( x0, y1, cbWidth / 2, cbHeight / 2, qgOnY, qgOnC, cbSubdiv + 2, cqtDepth + 1, 0, 0, 2, treeType, modeType ) | |
| if( y1 < pic_height_in_luma_samples && x1 < pic_width_in_luma_samples ) | |
| coding_tree( x1, y1, cbWidth / 2, cbHeight / 2, qgOnY, qgOnC, cbSubdiv + 2, cqtDepth + 1, 0, 0, 3, treeType, modeType ) | |
| } | |
| if( modeTypeCur == MODE_TYPE_ALL && modeType == MODE_TYPE_INTRA ) { | |
| coding_tree( x0, y0, cbWidth, cbHeight, 0, qgOnC, cbSubdiv, cqtDepth, mttDepth, 0, 0 DUAL_TREE_CHROMA , modeType ) | |
| } | |
| } else | |
| coding_unit( x0, y0, cbWidth, cbHeight, cqtDepth, treeTypeCurr , modeTypeCurr ) | |
| } | |

FIG. 12 (continued)

Multi-Type Tree Splitting Modes Indicated By MttSplitMode (informative)

Table 5: Specification of MttSplitMode[ x ][ y ][ mttDepth ] for x = x0..x0 + cbWidth − 1 and y = y0..y0 + cbHeight − 1

| MttSplitMode[ x0 ][ y0 ][ mttDepth ] | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

FIG. 14

Table 6: Section 7.3.2.3 Sequence parameter set RBSP syntax

| seq_parameter_set_rbsp( ) { | Descriptor |
|---|---|
| ... | |
|   if( ChromaArrayType != 0 ) | |
|     qtbtt_dual_tree_intra_flag | u(1) |
|   log2_min_luma_coding_block_size_minus2 | ue(v) |
|   partition_constraints_override_enabled_flag | u(1) |
|   sps_log2_diff_min_qt_min_cb_intra_slice_luma | ue(v) |
|   sps_log2_diff_min_qt_min_cb_inter_slice | ue(v) |
|   sps_max_mtt_hierarchy_depth_inter_slice | ue(v) |
|   sps_max_mtt_hierarchy_depth_intra_slice_luma | ue(v) |
|   if( sps_max_mtt_hierarchy_depth_intra_slice_luma != 0 ) { | |
|     sps_log2_diff_max_bt_min_qt_intra_slice_luma | ue(v) |
|     sps_log2_diff_max_tt_min_qt_intra_slice_luma | ue(v) |
|   } | |
|   if( sps_max_mtt_hierarchy_depth_inter_slice != 0 ) { | |
|     sps_log2_diff_max_bt_min_qt_inter_slice | ue(v) |
|     sps_log2_diff_max_tt_min_qt_inter_slice | ue(v) |
|   } | |
|   if( qtbtt_dual_tree_intra_flag ) { | |
|     sps_log2_diff_min_qt_min_cb_intra_slice_chroma | ue(v) |
|     sps_max_mtt_hierarchy_depth_intra_slice_chroma | ue(v) |
|     if( sps_max_mtt_hierarchy_depth_intra_slice_chroma != 0 ) { | |
|       sps_log2_diff_max_bt_min_qt_intra_slice_chroma | ue(v) |
|       sps_log2_diff_max_tt_min_qt_intra_slice_chroma | ue(v) |
|     } | |
|   } | |
| ... | |
| } | |

FIG. 15

Table 7: Section 7.3.2.6 Picture header RBSP syntax

| picture_header_rbsp( ) { | Descriptor |
|---|---|
| ... | |
|   if( partition_constraints_override_enabled_flag ) { | |
|     partition_constraints_override_flag | u(1) |
|     if( partition_constraints_override_flag ) { | |
|       pic_log2_diff_min_qt_min_cb_intra_slice_luma | ue(v) |
|       pic_log2_diff_min_qt_min_cb_inter_slice | ue(v) |
|       pic_max_mtt_hierarchy_depth_inter_slice | ue(v) |
|       pic_max_mtt_hierarchy_depth_intra_slice_luma | ue(v) |
|       if( pic_max_mtt_hierarchy_depth_intra_slice_luma != 0 ) { | |
|         pic_log2_diff_max_bt_min_qt_intra_slice_luma | ue(v) |
|         pic_log2_diff_max_tt_min_qt_intra_slice_luma | ue(v) |
|       } | |
|       if( pic_max_mtt_hierarchy_depth_inter_slice != 0 ) { | |
|         pic_log2_diff_max_bt_min_qt_inter_slice | ue(v) |
|         pic_log2_diff_max_tt_min_qt_inter_slice | ue(v) |
|       } | |
|       if( qtbtt_dual_tree_intra_flag ) { | |
|         pic_log2_diff_min_qt_min_cb_intra_slice_chroma | ue(v) |
|         pic_max_mtt_hierarchy_depth_intra_slice_chroma | ue(v) |
|         if( pic_max_mtt_hierarchy_depth_intra_slice_chroma != 0 ) { | |
|           pic_log2_diff_max_bt_min_qt_intra_slice_chroma | ue(v) |
|           pic_log2_diff_max_tt_min_qt_intra_slice_chroma | ue(v) |
|         } | |
|       } | |
|     } | |
|   } | |
| ... | |
| } | |

```
┌─────────────────────────────────────────┐  ╱─ 2001
│  Determine whether a coding block       │ ╱
│  includes samples outside a picture     │◄
│  boundary                               │
└─────────────────────────────────────────┘
                    │
                    │
┌─────────────────────────────────────────┐  ╱─ 2003
│  In response to the coding block being  │ ╱
│  determined to include samples outside  │◄
│  a picture boundary, splitting the      │
│  coding block using a QT mode           │
└─────────────────────────────────────────┘
```

FIG. 20

METHODS AND APPARATUSES FOR BLOCK PARTITIONING AT PICTURE BOUNDARY

CROSS-REFERENCE TO RELATED APPLICATIONS

The present disclosure claims priority to U.S. Provisional Application No. 62/948,856, filed on Dec. 17, 2019, which is incorporated herein by reference in its entirety.

TECHNICAL FIELD

The present disclosure generally relates to video processing, and more particularly, to methods and apparatuses for performing block partitioning at picture boundaries.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

In some embodiments, an exemplary video processing method includes: determining whether a coding block comprises samples outside a picture boundary; and in response to the coding block being determined to comprise samples outside a picture boundary, performing quad tree splitting of the coding block regardless of a value of a first parameter, wherein the first parameter indicates whether the quad tree is allowed to be used to split the coding block.

In some embodiments, an exemplary video processing apparatus includes at least one memory for storing instructions and at least one processor. The at least one processor is configured to execute the inst actions to cause the apparatus to perform: determining whether a coding block comprises samples outside a picture boundary; and in response to the coding block being determined to comprise samples outside a picture boundary, performing quad tree splitting of the coding block regardless of a value of a first parameter, wherein the first parameter indicates whether the quad tree is allowed to be used to split the coding block.

In some embodiments, an exemplary non-transitory computer readable storage medium stores a set of instructions. The set of instructions are executable by one or more processing devices to cause a video processing apparatus to perform: determining whether a coding block comprises samples outside a picture boundary; and in response to the coding block being determined to comprise samples outside a picture boundary, performing quad tree splitting of the coding block regardless of a value of a first parameter, wherein the first parameter indicates whether the quad tree is allowed to be used to split the coding block.

BRIEF DESCRIPTION OF THE DRAWINGS

Embodiments and various aspects of the present disclosure are illustrated in the following detailed description and the accompanying figures. Various features shown in the figures are not drawn to scale.

FIG. 7 illustrates an exemplary Table 1 showing exemplary multi-type tree splitting mode (MttSplitMode) derivation based on multi-type tree syntax elements, according to some embodiments of the present disclosure.

FIG. 10 illustrates an exemplary Table 2 showing exemplary specification of parallel ternary tree split (parallelTtSplit) and coding block size (cbSize) based on binary split mode (btSplit), according to some embodiments of the present disclosure.

FIG. 11 illustrates an exemplary Table 3 showing exemplary specification of cbSize based on ternary tree split mode (ttSplit), according to some embodiments of the present disclosure.

FIG. 12 illustrates an exemplary Table 4 showing an exemplary coding tree syntax, according to some embodiments of the present disclosure.

FIG. 14 illustrates an exemplary Table 5 showing an exemplary specification of MttSplitMode, according to some embodiments of the present disclosure.

FIG. 15 illustrates an exemplary Table 6 showing an exemplary sequence parameter set RBSP syntax, according to some embodiments of the present disclosure.

FIG. 16 illustrates an exemplary Table 7 showing an exemplary picture header RBSP syntax, according to some embodiments of the present disclosure.

FIG. 20 illustrates a flowchart of an exemplary video processing method, according to some embodiments of the present disclosure.

DETAILED DESCRIPTION

Figure 1:
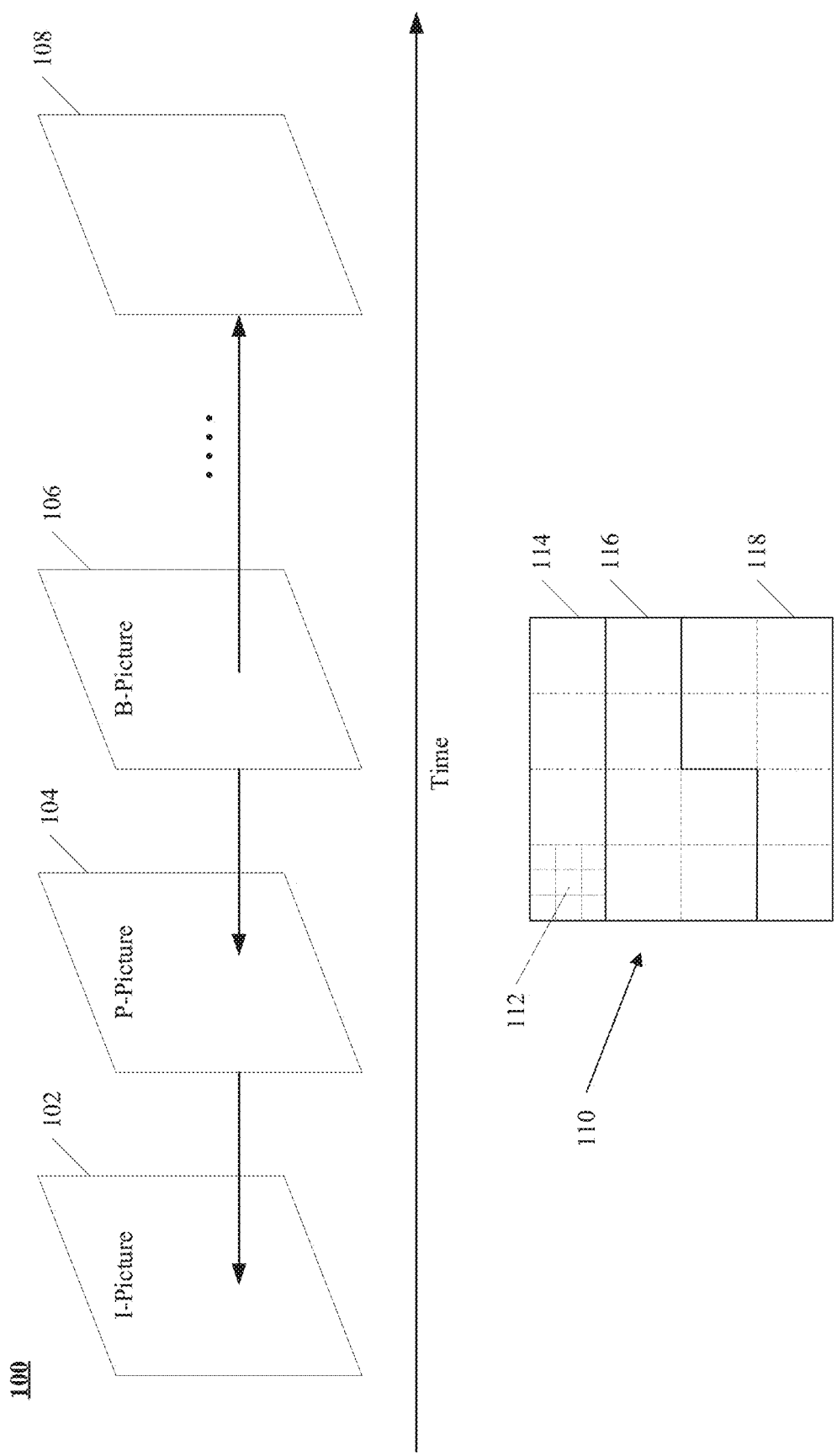
FIG. 1 is a schematic diagram illustrating structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

In order to achieve the same subjective quality as HEVC/H.265 using half the bandwidth, the JVET has been developing technologies beyond HEVC, using the joint exploration model (JEM) reference software. As coding technologies were incorporated into the JEM, the JEM achieved substantially higher coding performance than HEVC.

The VVC standard has been developed recent, and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
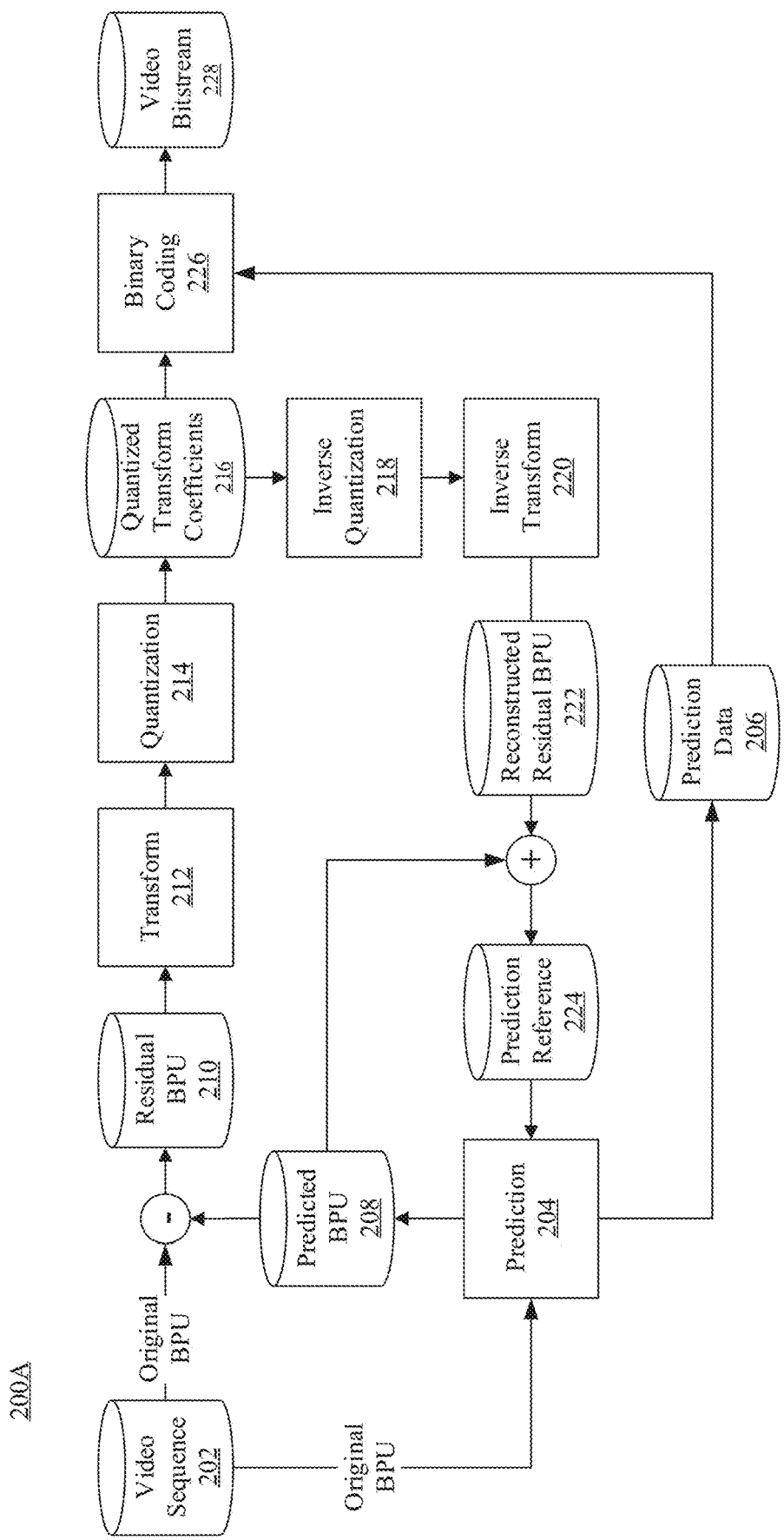
FIG. 2A is a schematic diagram illustrating an exemplary encoding process of a hybrid video coding system, consistent with embodiments of the disclosure.
Figure 2B:
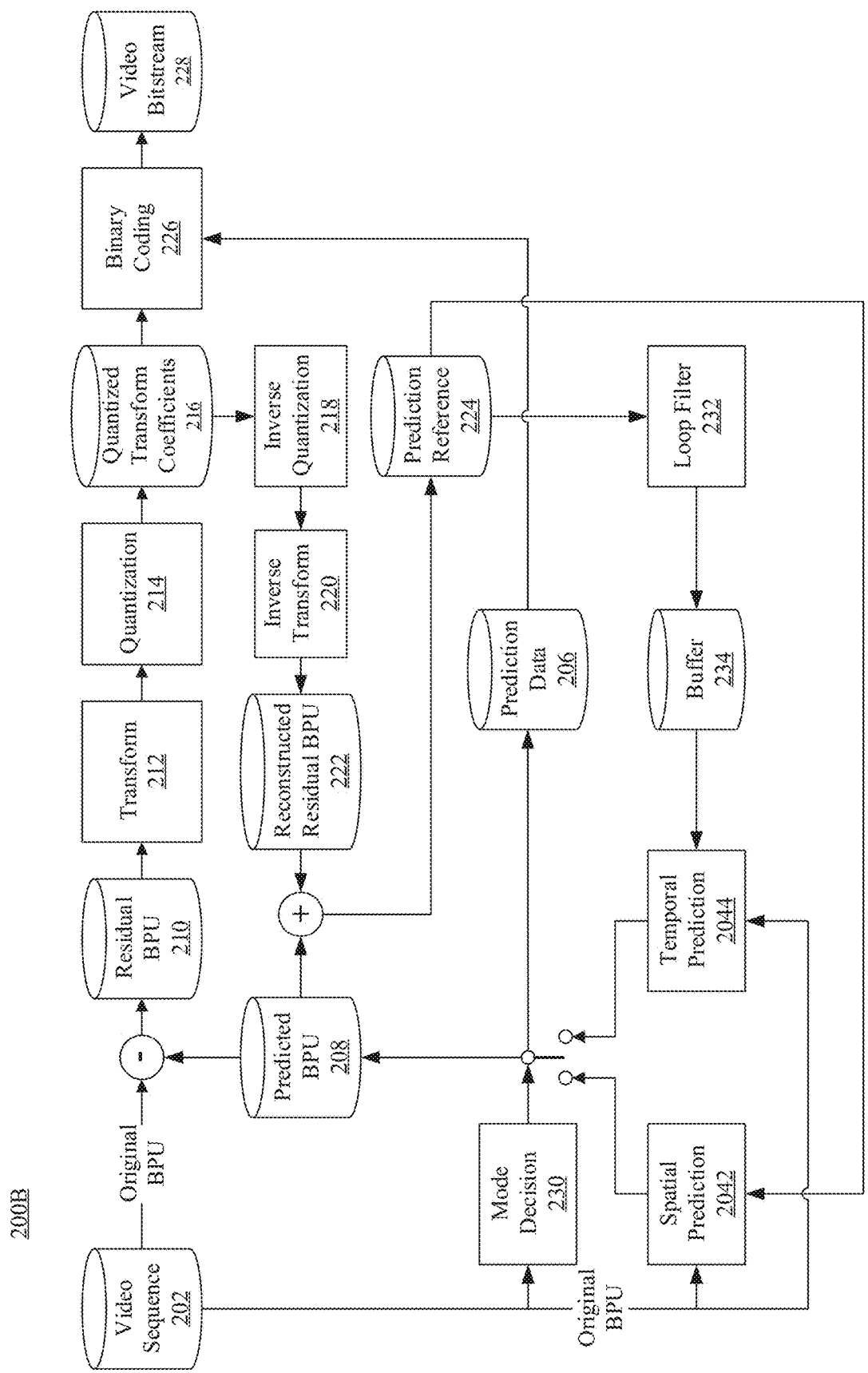
FIG. 2B is a schematic diagram illustrating another exemplary encoding process of a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can teed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e. trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or loss compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (i.e., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (i.e., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path; after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
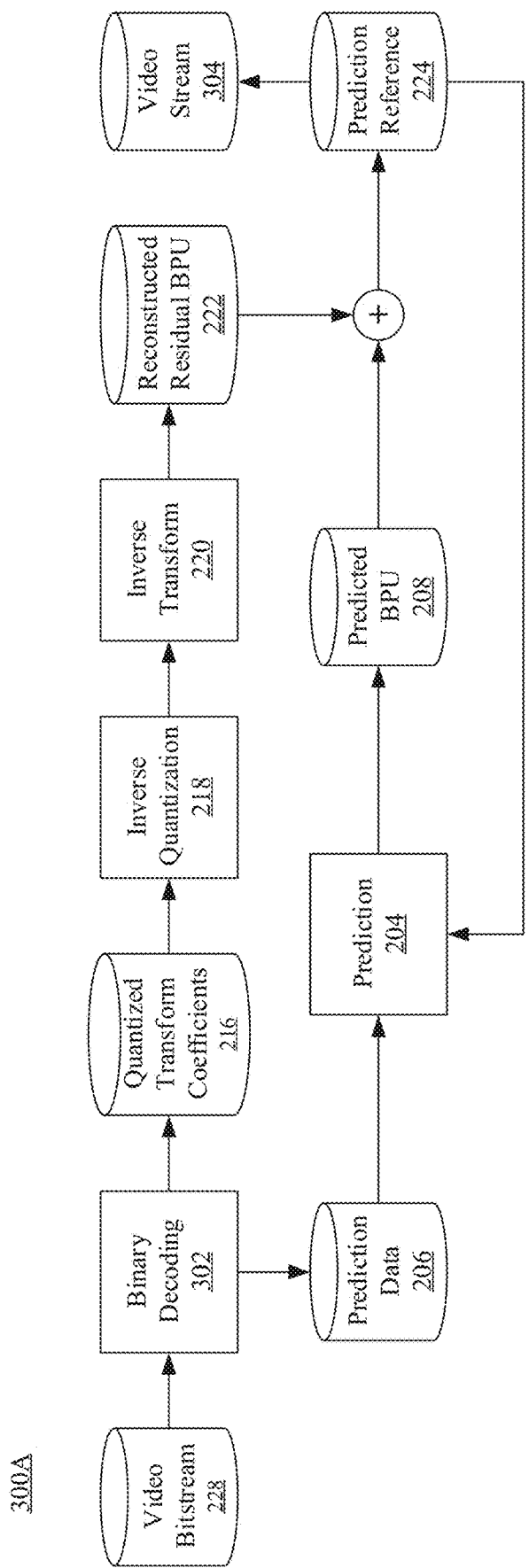
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process(e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). It some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
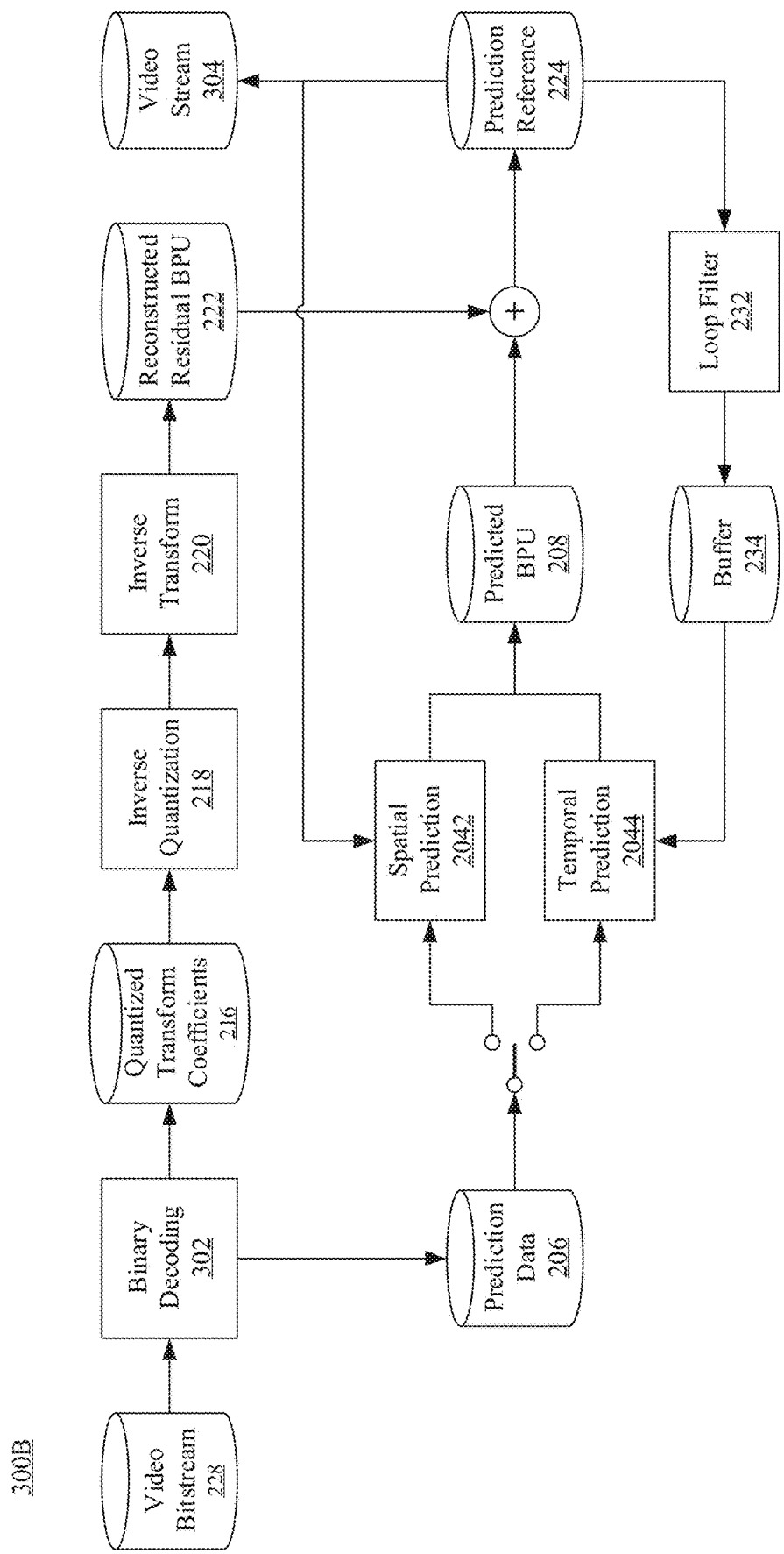
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current RPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 28. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
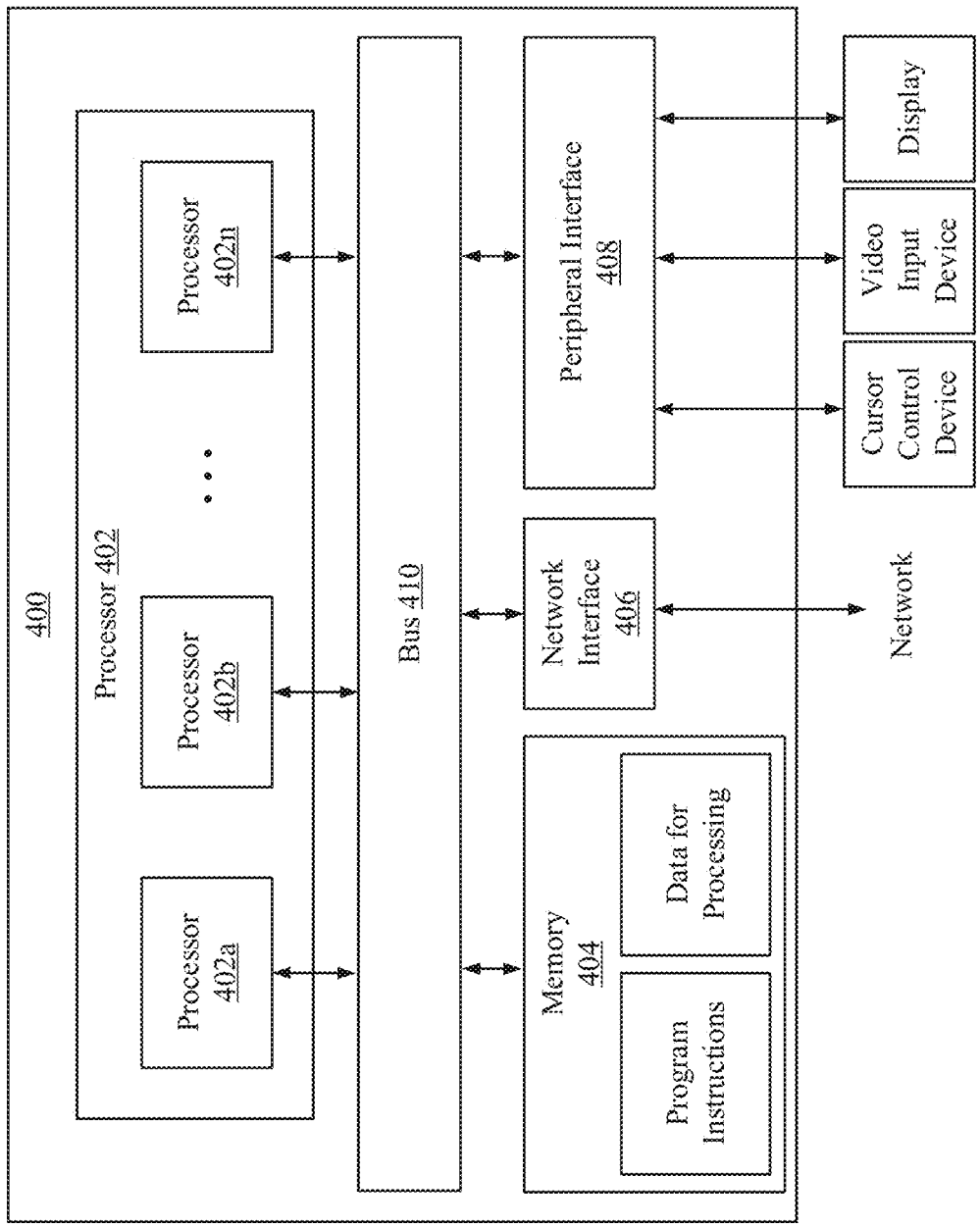
FIG. 4 is a block diagram of an exemplary apparatus for encoding or decoding a video, according to some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data. processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

In the quantization and inverse quantization functional blocks (e.g., quantization 214 and inverse quantization 218 of FIG. 2A or FIG. 2B, inverse quantization 218 of FIG. 3A or FIG. 3B), a quantization parameter (QP) is used to determine the amount of quantization (and inverse quantization) applied to the prediction residuals. Initial QP values used for coding of a picture or slice may be signaled at the high level, for example, using init_qp_minus26 syntax element in the Picture Parameter Set (PPS) and using slice_qp_delta syntax element in the slice header. Further, the QP values may be adapted at the local level for each CU using delta QP values sent at the granularity of quantization groups.

Figure 5:
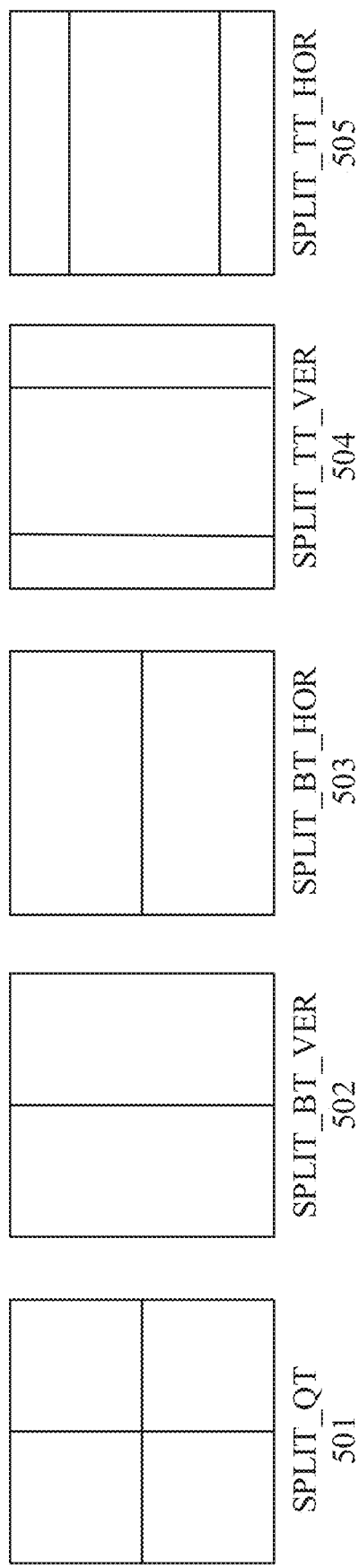
FIG. 5 is a schematic diagram illustrating examples of multi-type tree splitting modes, according to some embodiments of the present disclosure.

According to some embodiments, a picture can be split into multiple coding tree units (CTU). Then, a CTU is further split into one or more coding units (CU) using a quadtree (SPLIT_QT) with nested multi-type tree using binary and ternary splits segmentation structure. FIG. 5 is a schematic diagram illustrating examples of multi-type tree splitting modes, according to some embodiments of the present disclosure. As shown in FIG. 5, splitting types in multi-type tree structure can include a quadtree splitting (SPLIT_QT) 501, vertical binary splitting (SPLIT_BT_VER) 502, horizontal binary splitting (SPLIT_BT_HOR) 503, vertical ternary splitting (SPLIT_TT_VER) 504, and horizontal ternary splitting (SPLIT_TT_HOR) 505. The multi-type tree leaf nodes are called coding units (CUs) which can have either a square or rectangular shape.

Figure 6:
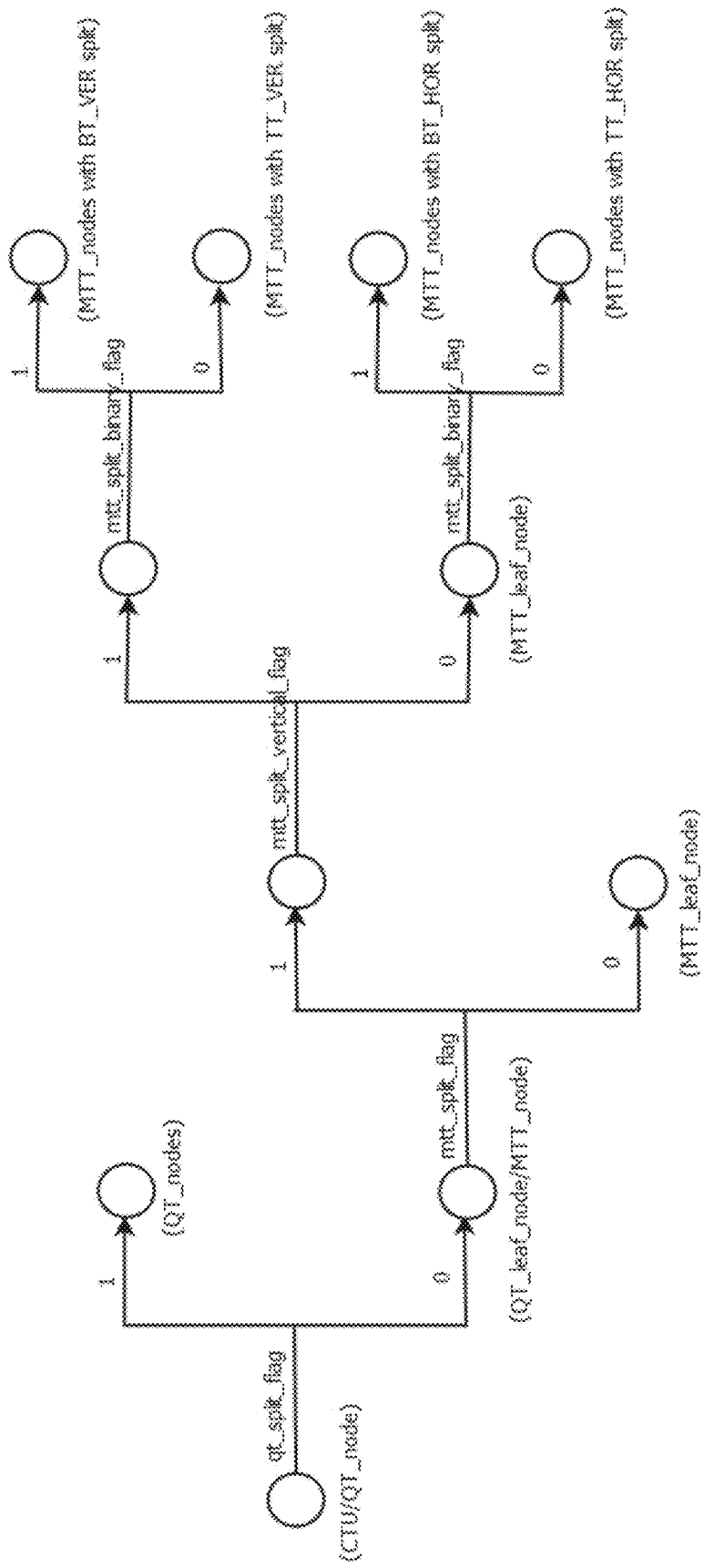
FIG. 6 is a schematic diagram illustrating an exemplary signaling mechanism for partition splitting information in quad-tree (QT) with nested multi-type tree coding tree structure, according to some embodiments of the present disclosure.

FIG. 6 is a schematic diagram illustrating an exemplary signaling mechanism for partition splitting information in quadtree with nested multi-type tree coding tree structure, according to some embodiments of the present disclosure. As shown in FIG. 6, a CTU is treated as the root of a quaternary tree and is first partitioned by a quaternary tree structure. Each quaternary tree leaf node (when sufficiently large to allow it) is further partitioned by a multi-type tree structure. In the multi-type tree structure, a first flag (e.g., mtt_split_cu_flag) is signaled to indicate whether the node is further partitioned. When a node is further partitioned, a second flag (e.g., mtt_split_cu_vertical_flag) is signaled to indicate the splitting direction, and then a third flag (e.g., mtt_split_cu_binary_flag) is signaled to indicate whether the split is a binary split or a ternary split. Based on the values of the second and third flags, mtt_split_cu_vertical_flag and mtt_split_cu_binary_flag, the multi-type tree splitting mode (MttSplitMode) of a CU can be derived. FIG. 7 illustrates an exemplary Table 1 showing exemplary MttSplitMode derivation based on multi-type tree syntax elements, according to some embodiments of the present disclosure.

Figure 8:
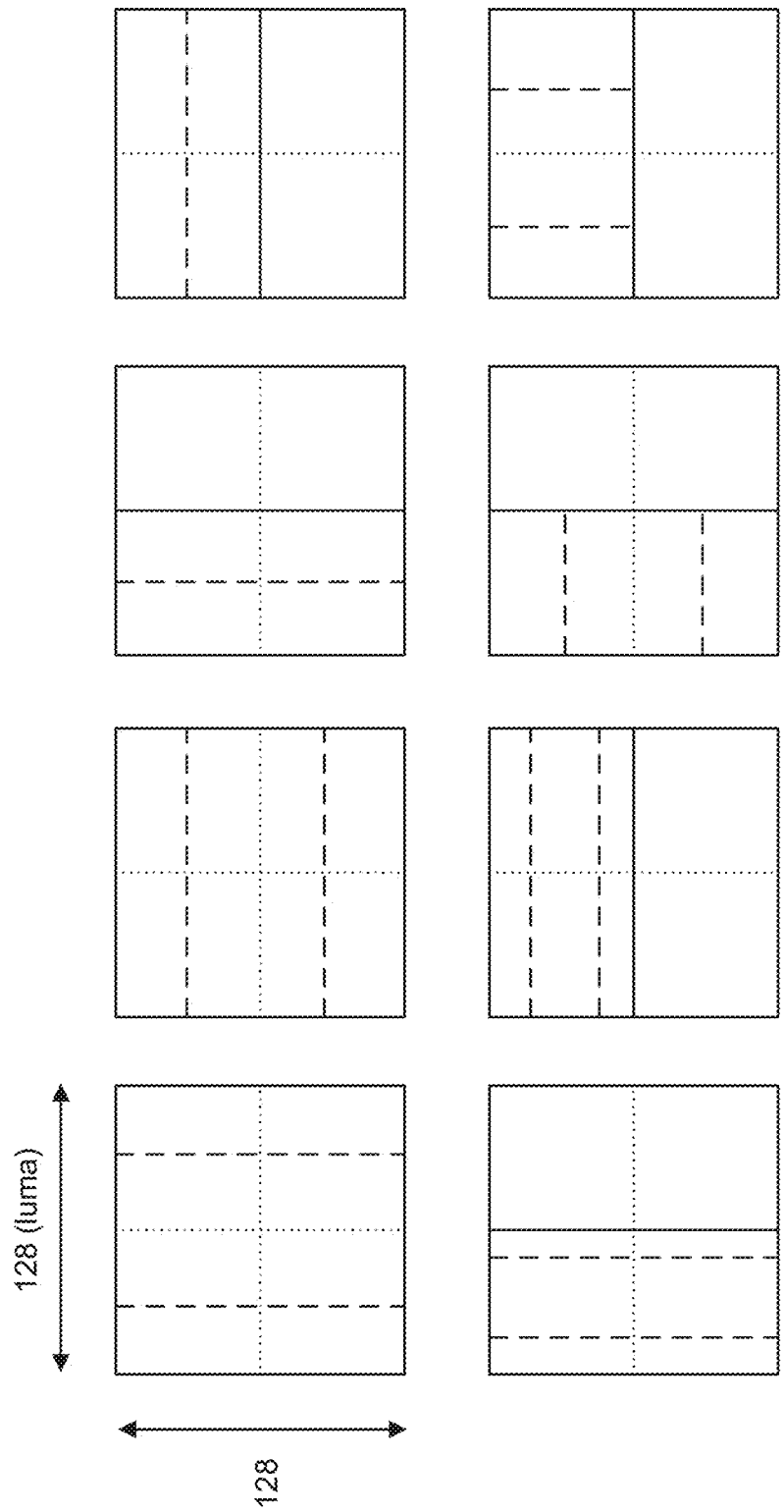
FIG. 8 is a schematic diagram illustrating examples of disallowed ternary tree (TT) and binary tree (BT) partitioning, according to some embodiments of the present disclosure.

Virtual pipeline data units (VPDUs) are defined as non-overlapping units in a picture. In hardware decoders, successive VPDUs are processed by multiple pipeline stages at the same time. The VPDU size is roughly proportional to the buffer size in most pipeline stages, so it is important to keep the VPDU size small. In most hardware decoders, the VPDU size can be set to 64×64 luma samples. However, in some embodiments, ternary tree (TT) and binary tree (BT) partition may lead to the increasing of VPDUs size. Consistent with the present disclosure, in order to keep the VPDU size as 64×64 luma samples, certain normative partition restrictions can be applied. FIG. 8 illustrates examples of disallowed TT and BT partitioning, according to some embodiments of the present disclosure. As shown in FIG. 8, TT split is not allowed for a block with either width or height, or both width and height equal to 128. For a 128×N CU with N≤64 (e.g., width equal to 128 and height smaller than 128), horizontal BT is not allowed. For an N×128 CU with N≤64 (e.g., height equal to 128 and width smaller than 128), vertical BT is not allowed.

As required in HEVC, when a portion of a tree node block exceeds the bottom or right picture boundary, the tree node block is forced to be split until all samples of every coded CU are located inside the picture boundaries. The following splitting rules are applied in the VVC draft 7:
 If a portion of a tree node block exceeds both the bottom and the right picture boundaries,
  If the block is a QT node and the size of the block is larger than the minimum QT size, the block is forced to be split with QT split mode.
  Otherwise, the block is forced to be split with SPLIT_BT_HOR mode.

Otherwise if a portion of a tree node block exceeds the bottom picture boundaries,
   If the block is a QT node, and the size of the block is larger than the minimum QT size, and the size of the block is larger than the maximum BT size, the block is forced to be split with QT split mode.
   Otherwise, if the block is a QT node, and the size of the block is larger than the minimum QT size and the size of the block is smaller than or equal to the maximum BT size, the block is forced to be split with QT split mode or SPLIT_BT_HOR mode.
   Otherwise (the block is a BT node or the size of the block is smaller than or equal to the minimum QT size), the block is forced to be split with SPLIT_BT_HOR mode.
Otherwise if a portion of a tree node block exceeds the right picture boundaries,
   If the block is a QT node, and the size of the block is larger than the minimum QT size, and the size of the block is larger than the maximum BT size, the block is forced to be split with QT split mode.
   Otherwise, if the block is a QT node, and the size of the block is larger than the minimum QT size and the size of the block is smaller than or equal to the maximum BT size, the block is forced to be split with QT split mode or SPLIT_BT_VER mode.
   Otherwise (e.g., the block is a BT node or the size of the block is smaller than or equal to the minimum QT size), the block is forced to be split with SPLIT_BT_VER mode.

Figure 9:
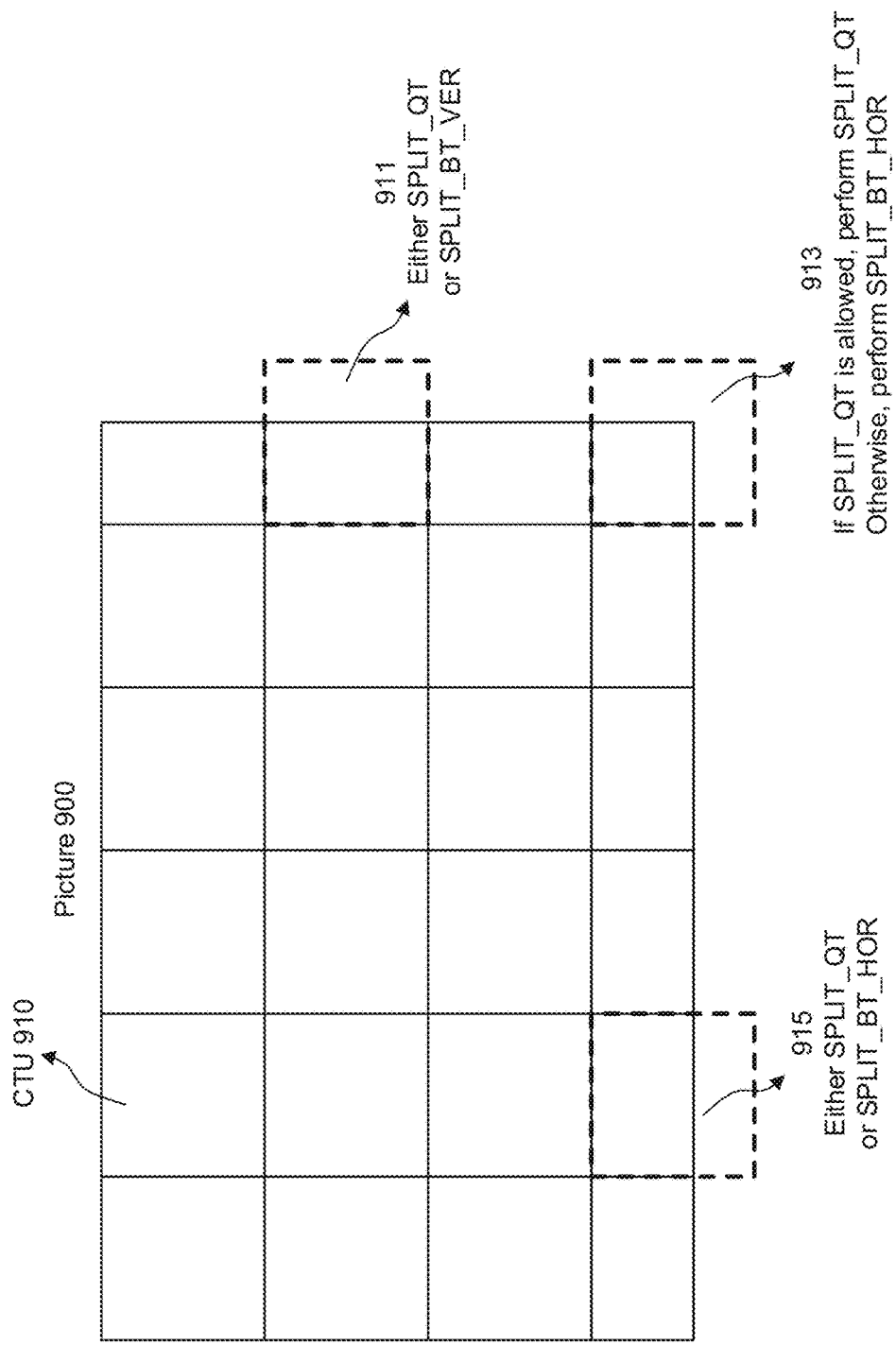
FIG. 9 is a schematic diagram illustrating exemplary block partitioning on picture boundaries, according to some embodiments of the present disclosure.

FIG. 9 illustrates exemplary block partitioning on picture boundaries, according to some embodiments of the present disclosure. As shown in FIG. 9, for CTU 911, either SPLIT_QT or SPLIT_BT_VER can be performed. For CTU 913, if SPLIT_QT is allowed, SPLIT_QT can be performed. If SPLIT_QT is not allowed, SPLIT_BT_HOR can be performed. For CTU 915, either SPLIT_QT or SPLIT_BT_HOR can be performed.

In VVC draft 7, there are two sections related to block partitioning. The first is Section 6.4 which defines whether a block can be split using quad tree, binary tree or ternary tree. The outputs of the section 6.4 are variables allowSplitQt, allowSplitBtHor, allowSplitBtVer, allowSplitTtHor and allowSplitTtVer. These variables are used in Section 7.3.9.4 as shown in Table 4 of FIG. 12 to determine whether the corresponding CU level splitting flags (marked by boxes 1201-1204 in Table 4 of FIG. 12) are signaled or not.

Section 6.4.1 of VVC draft 7 describes:
6.4 Availability Processes
6.4.1 Allowed Quad Split Process
Inputs to this process are:
a coding block size cbSize in luma samples,
a multi-type tree depth mttDepth,
a variable treeType specifying whether a single tree SINGLE_TREE) or a dual tree is used to partition the coding tree node and, when a dual tree is used, whether the luma (DUAL_TREE_LUMA) or chroma components (DUAL_TREE_CHROMA) are currently processed,
a variable modeType specifying whether intra (MODE_INTRA), IBC (MODE_IBC), and inter coding modes can be used (MODE_TYPE_ALL), or whether only intra and IBC coding modes can be used (MODE_TYPE_INTRA), or whether only inter coding modes can be used (MODE_TYPE_INTER) for coding units inside the coding tree node.

Output of this process is the variable allowSplitQt. The variable allowSplitQt is derived as follows:
   If one or more of the following conditions are true, allowSplitQt is set equal to FALSE:
      treeType is equal to SINGLE_TREE or DUAL_TREE_LUMA and cbSize is less than or equal to MinQtSizeY
      treeType is equal to DUAL_TREE_CHROMA and cbSize/SubWidthC is less than or equal to MinQtSizeC
      mttDepth is not equal to 0
      treeType is equal to DUAL_TREE_CHROMA and (cbSize/SubWidthC) is less than or equal to 4
      treeType is equal to DUAL_TREE_CHROMA and modeType is equal to MODE_TYPE_INTRA
   Otherwise, allowSplitQt is set equal to TRUE
Section 6.4.2 of VVC draft 7 describes:
6.4.2 Allowed Binary Split Process
Inputs to this process are
a binary split mode btSplit,
a coding block width cbWidth in luma samples.
a coding block height cbHeight in luma samples,
a location (x0, y0) of the top-left luma sample of the considered coding block relative to the top-left luma sample of the picture,
a multi-type tree depth mttDepth,
a maximum multi-type tree depth with offset maxMttDepth,
a maximum binary tree size maxBtSize,
a minimum quadtree size minQtSize.
a partition index partIdx,
a variable treeType specifying whether a single tree (SINGLE_TREE) or a dual tree is used to partition the coding tree node and, when a dual tree is used, whether the luma (DUAL_TREE_LUMA) or chroma components (DUAL_TREE_CHROMA) are currently processed,
a variable modeType specifying whether intra (MODE_INTRA), IBC (MODE_IBC), and inter coding modes can be used (MODE_TYPE_ALL), or whether only intra and IBC coding modes can be used (MODE_TYPE_INTRA), or whether only inter coding modes can be used (MODE_TYPE_INTER) for coding units inside the coding tree node.

Output of this process is the variable allowBtSplit. FIG. 10 illustrates an exemplary Table 2 showing exemplary specification of variables parallelTtSplit and cbSize based on btSplit, according to some embodiments of the present disclosure.

The variable allowBtSplit derived as follows:
   If one or more of the following conditions are true, allowBtSplit is set equal FALSE:
      cbSize is less than or equal to MinBtSizeY
      cbWidth is greater than maxBtSize
      cbHeight is greater than maxBtSize
      mttDepth is greater than or equal to maxMttDepth
      treeType is equal to DUAL_TREE_CHROMA and (cbWidth/SubWidthC)*(cbHeight/SubHeightC) is less than or equal to 16
      treeType is equal to DUAL_TREE_CHROMA and (cbWidth/SubWidthC) is equal to 4 and btSplit is equal to SPLIT_BT_VER
      treeType is equal to DUAL_TREE_CHROMA and modeType is equal to MODE_TYPE_INTRA
      cbWidth*cbHeight is equal to 32 and modeType is equal to MODE_TYPE_INTER Otherwise, if all of the following conditions are true, allowBtSplit is set equal to FALSE
  btSplit is equal to SPLIT_BT_VER
  y0+cbHeight is greater than pic_height_in_luma_samples
Otherwise, if all of the following conditions are true, allowBtSplit is set equal to FALSE
  btSplit is equal to SPLIT_BT_VER
  cbHeight is greater than 64
  x0+cbWidth is greater than pic_width_in_luma_samples
Otherwise, if all of the following conditions are true, allowBtSplit is set equal to FALSE
  btSplit is equal to SPLIT_BT_HOR
  cbWidth is greater than 64
  y0+cbHeight is greater than pic_height_in_luma_samples
Otherwise, if all of the following conditions are true, allowBtSplit is set equal to FALSE
  x0+cbWidth is greater than pic_width_in_luma_samples
  y0+cbHeight is greater than pic_height_in_luma_samples
  cbWidth is greater than minQtSize
Otherwise, if all of the following conditions are true, allowBtSplit is set equal to FALSE
  btSplit is equal to SPLIT_BT_HOR
  x0+cbWidth is greater than pic_width_in_luma_samples
  y0+cbHeight is less than or equal to pic_height_in_luma_samples
Otherwise, if all of the following conditions are true, allowBtSplit is set equal to FALSE:
  mttDepth is greater than 0
  partIdx is equal to 1
  MttSplitMode[x0][y0][mttDepth−1] is equal to parallelTtSplit
Otherwise, if all of the following conditions are true, allowBtSplit is set equal to FALSE
  btSplit is equal to SPLIT_BT_VER
  cbWidth is less than or equal to 64
  cbHeight is greater than 64
Otherwise, if all of the following conditions are true, allowBtSplit is set equal to FALSE
  btSplit is equal to SPLIT_BT_HOR
  cbWidth is greater than 64
  cbHeight is less than or equal to 64
Otherwise, allowBtSplit is set equal to TRUE.
Section 6.4.3 of VVC draft 7 describes:
6.4.3 ALLOWED TERNARY SPLIT PROCESS
Inputs to this process are:
a ternary split mode ttSplit,
a coding block width cbWidth in luma samples,
a coding block height cbHeight in luma samples,
a location (x0, y0) of the top-left luma sample of the considered coding block relative to the top-left luma sample of the picture,
a multi-type tree depth mttDepth
a maximum multi-type tree depth with offset maxMttDepth,
a maximum ternary tree size maxTtSize,
a variable treeType specifying whether a single tree (SINGLE_TREE) or a dual tree is used to partition the coding tree node and, when a dual tree is used, whether the luma (DUAL_TREE_LUMA) or chroma components (DUAL_TREE_CHROMA) are currently processed,
a variable modeType specifying whether intra (MODE_INTRA), IBC (MODE_IBC), and inter coding modes can be used (MODE_TYPE_ALL), or whether only intra and IBC coding modes can be used (MODE_TYPE_INTRA), or whether only inter coding modes can be used (MODE_TYPE_INTER) for coding units inside the coding tree node.
Output of this process is the variable allowTtSplit. FIG. 11 illustrates an exemplary Table 3 showing exemplary specification of variable cbSize based on ttSplit, according to some embodiments of the present disclosure.
The variable allowTtSplit is derived as follows:
If one or more of the following conditions are true, allowTtSplit is set equal to FALSE:
  cbSize is less than or equal to 2*MinTtSizeY
  cbWidth is greater than Min(64, maxTtSize)
  cbHeight is greater than Min(64, maxTtSize)
  mttDepth is greater than or equal to maxMttDepth
  x0+cbWidth is greater than pic_width_in_luma_samples
  y0+cbHeight is greater than pic_height_in_luma_samples
  treeType is equal to DUAL_TREE_CHROMA and (cbWidth/SubWidthC)*(cbHeight/SubHeightC) is less than or equal to 32
  treeType is equal to DUAL_TREE_CHROMA and (cbWidth/SubWidthC) is equal to 8 and ttSplit is equal to SPLIT_TT_VER
  treeType is equal to DUAL_TREE_CHROMA and modeType is equal to MODE_TYPE_INTRA
  cbWidth*cbHeight is equal to 64 and modeType is equal to MODE_TYPE_INTER
Otherwise, allowTtSplit is set equal to TRUE.
FIG. 12 illustrates an exemplary Table 4 showing exemplary Section 7.3.9.4 coding tree syntax (emphases added in italics and shadow) of VVC draft 7, according to some embodiments of the present disclosure.
The variables allowSplitQt, allowSplitBtVer, allowSplitBtHor, allowSplitTtVer, and allowSplitTtHor are derived as follows:
  The allowed quad split process as specified in clause 6.4.1 is invoked with the coding block size cbSize set equal to cbWidth, the current multi-type tree depth mttDepth, treeTypeCurr and modeTypeCurr as inputs, and the output is assigned to allowSplitQt.
  The variables minQtSize, maxBtSize, maxTtSize and maxMttDepth are derived as follows:
    If treeType is equal to DUAL_TREE_CHROMA, minQtSize, maxBtSize, maxTtSize and maxMttDepth are set equal to MinQtSizeC, MaxBtSizeC, MaxTtSizeC and MaxMttDepthC+depthOffset, respectively.
    Otherwise, minQtSize, maxBtSize, maxTtSize and maxMttDepth are set equal to MinQtSizeY, MaxBtSizeY, MaxTtSizeY and MaxMttDepthY+depthOffset, respectively.
  The allowed binary split process as specified in clause 6.4.2 is invoked with the binary split mode SPLIT_BT_VER, the coding block width cbWidth, the coding block height cbHeight, the location (x0, y0), the current multi-type tree depth mttDepth, the maximum multi-type tree depth with offset maxMttDepth, the maximum binary tree size maxBtSize, the minimum quadtree size minQtSize, the current partition index partIdx, treeTypeCurr and modeTypeCurr as inputs, and the output is assigned to allowSplitBtVer.

The allowed binary split process as specified in clause 6.4.2 is invoked with the binary split mode SPLIT_BT_HOR, the coding block height cbHeight, the coding block width cbWidth, the location (x0, y0), the current multi-type tree depth mttDepth, the maximum multi-type tree depth with offset maxMttDepth, the maximum binary tree size maxBtSize, the minimum quadtree size minQtSize, the current partition index partIdx, treeTypeCurr and modeTypeCurr as inputs, and the output is assigned to allowSplitBtHor.

The allowed ternary split process as specified in clause 6.4.3 is invoked with the ternary split mode SPLIT_TT_VER, the coding block width cbWidth, the coding block height cbHeight, the location (x0, y0), the current multi-type tree depth mttDepth, the maximum multi-type tree depth with offset maxMttDepth, the maximum ternary tree size rnaxTtSize, treeTypeCurr and modeTypeCurr as inputs, and the output is assigned to allowSplitTtVer.

The allowed ternary split process as specified in clause 6.4.3 is invoked with the ternary split mode SPLIT_TT_HOR, the coding block height cbHeight, the coding block width cbWidth, the location (x0, y0), the current multi-type tree depth mttDepth, the maximum multi-type tree depth with offset maxMttDepth, the maximum ternary tree size maxTtSize, treeType-Curr and modeTypeCurr as inputs, and the output is assigned to allowSplitTtHor.

Syntax element split_cu_flag equal to 0 specifies that a coding unit is not split. Syntax element split_cu_flag equal to 1 specifies that a coding unit is split into four coding units using a quad split as indicated by the syntax element split_qt_flag, or into two coding units using a binary split or into three coding units using a ternary split as indicated by the syntax element mtt_split_cu_binary_flag. The binary or ternary split can be either vertical or horizontal as indicated by the syntax element mtt_split_cu_vertical_flag.

When syntax element split_cu_flag is not present, the value of split_cu_flag is inferred as follows:
If one or more of the following conditions are true, the value of split_cu_flag is inferred to be equal to 1:
x0+cbWidth is greater than pic_width_in_luma_samples.
y0+cbHeight is greater than pic_height_in_luma_samples.
Otherwise, the value of split_cu_flag is inferred to be equal to 0.

Syntax element split_qt_flag specifies whether a coding unit is split into coding units with half horizontal and vertical size.

When syntax element split_qt_flag is not present, the following applies:
If allowSplitQt is equal to TRUE, the value of split_qt_flag is inferred to be equal to 1.
Otherwise, the value of split_qt_flag is inferred to be equal to 0.

Syntax element mtt_split_cu_vertical_flag equal to 0 specifies that a coding unit is split horizontally. Syntax element mtt_split_cu_vertical_flag equal to 1 specifies that a coding unit is split vertically.

When syntax element mtt_split_cu_vertical_flag is not present, it is inferred as follows:
If allowSplitBtHor is equal to TRUE or allowSplitTtHor is equal to TRUE, the value of mtt_split_cu_vertical_flag is inferred to be equal to 0.
Otherwise, the value of mtt_split_cu_vertical_flag is inferred to be equal to 1.

Syntax element mtt_split_cu_binary_flag equal to 0 specifies that a coding unit is split into three coding units using a ternary split. Syntax element mtt_split_cu_binary_flag equal to 1 specifies that a coding unit is split into two coding units using a binary split.

When syntax element mtt_split_cu_binary_flag is not present, it is inferred as follows:
If allowSplitBtVer is equal to FALSE and allowSplitBtHor is equal to FALSE, the value of mtt_split_cu_binary_flag is inferred to be equal to 0.
Otherwise, if allowSplitTtVer is equal to FALSE and allowSplitTtHor is equal to FALSE, the value of mtt_split_cu_binary_flag is inferred as to be equal to 1.
Otherwise, if allowSplitBtHor is equal to TRUE and allowSplitTtVer is equal to TRUE, the value of mtt_split_cu_binary_flag is inferred to be equal to !mtt_split_cu_vertical_flag.
Otherwise (allowSplitBtVer is equal to TRUE and allowSplitTtHor is equal to TRUE), the value of mtt_split_cu_binary_flag is inferred to be equal to mtt_split_cu_vertical_flag.

FIG. 14 illustrates an exemplary Table 5 showing an exemplary specification of MttSplitMode, according to some embodiments of the present disclosure. The variable MttSplitMode[x][y][mttDepth] is derived from the value of syntax element mtt_split_cu_vertical_flag and from the value of syntax element mtt_split_cu_binary_flag as defined in Table 4 for x=x0 . . . x0+cbWidth−1 and y=y0 . . . y0+cbHeight−1.

Figure 13:
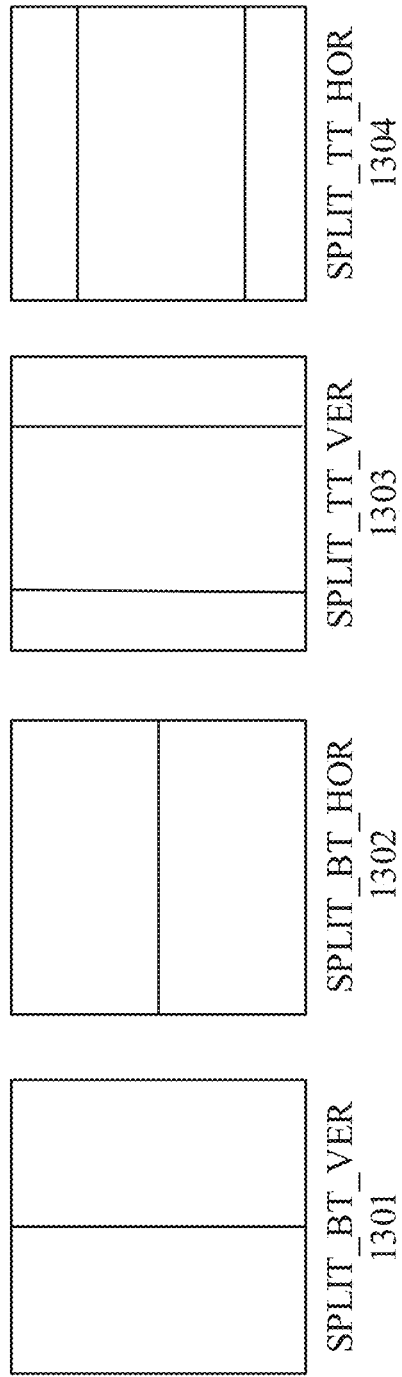
FIG. 13 is a schematic diagram illustrating examples of multi-type tree splitting modes indicated by MttSplitMode, according to some embodiments of the present disclosure.

MttSplitMode[x0][y0][mttDepth] represents horizontal binary, vertical binary, horizontal ternary, and vertical ternary splittings of a coding unit within the multi-type tree. The array indices x0, y0 specify the location (x0, y0) of the top-left luma sample of the considered coding block relative to the top-left luma sample of the picture. FIG. 13 illustrates examples of multi-type tree splitting modes indicated by MttSplitMode, according to some embodiments of the present disclosure. As shown in FIG. 13, multi-type tree splitting modes can include vertical binary splitting (SPLIT_BT_VER) 1301, horizontal binary splitting (SPLIT_BT_HOR) 1302, vertical ternary splitting (SPLIT_TT_VER) 1303, and horizontal ternary splitting (SPLIT_TT_HOR) 1304.

It is noted that CTU size, min block size and the block size restriction for quad tree, binary tree and ternary tree splittings are signaled in either sequence parameter sets or picture header.

FIG. 15 illustrates an exemplary Table 6 showing exemplary Section 7.3.2.3 sequence parameter set RBSP syntax of VVC draft 7, according to some embodiments of the present disclosure. FIG. 16 illustrates an exemplary Table 7 showing exemplary Section 7.3.2.6 picture header RBSP syntax of VVC draft 7, according to some embodiments of the present disclosure.

Figure 17:
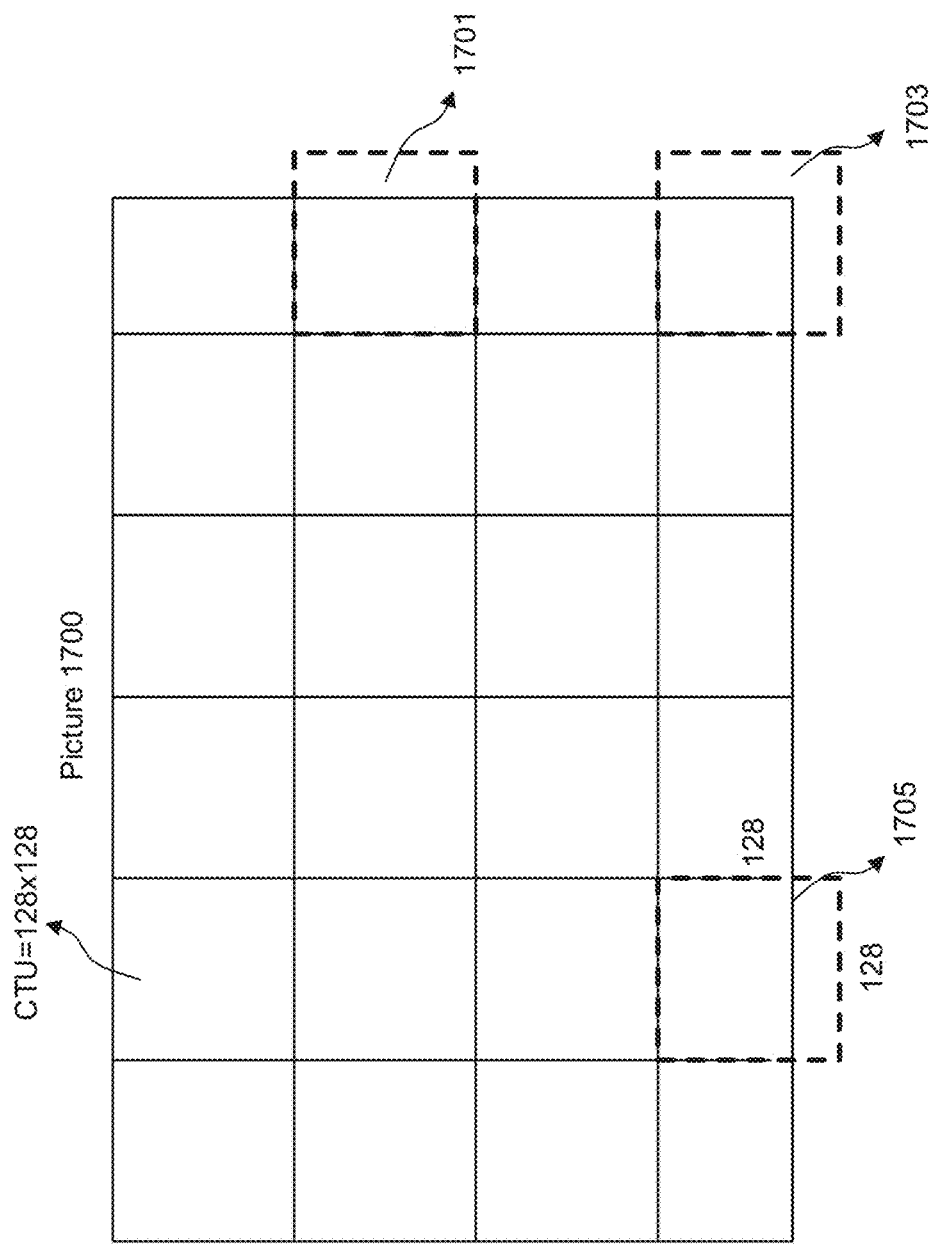
FIG. 17 is a schematic diagram illustrating exemplary blocks of which none of QT; TT, or BT splitting is allowed at picture boundaries, according to some embodiments of the present disclosure.

According to some embodiments, when a portion of a tree node block exceeds the bottom or right picture boundary, the tree node block is forced to be split until all the samples of every coded block are located inside the picture boundaries. However, there are cases when all the tree splitting modes are not allowed for a block located at picture boundary and contained samples exceeded the picture boundary. FIG. 17 illustrates exemplary blocks that none of QT, TT, or BT splitting is allowed at picture boundaries, according to some embodiments of the present disclosure. For example, FIG. 17 shows CTU 1701, CTU 1703, and CTU 1705 at picture boundaries for which none of QT, TT, or BT splitting is allowed.

As a first exemplary case in which all the tree splitting modes are disallowed, when both of the CTU size and min QT size are set to 128, all the variables allowSplitQt, allowSplitBtHor, allowSplitBtVer, allowSplitTtHor and allowSplitTtVer are set to false.

The variable allowSplitQt is set to be false due to the following conditions (emphases in italics):

6.4.1 Allowed Quad Split Process
If one or more of the following conditions are true, allowSplitQt is set equal to FALSE:
treeType is equal to SINGLE_TREE or DUAL_TREE_LUMA and cbSize is less than or equal to *MinQtSizeY*
treeType is equal to DUAL_TREE_CHROMA and cbSize/SubWidthC is less than or equal to *MinQtSizeC*

The variable allowSplitBtHor is set to be false due to the following conditions (emphases in italics):

6.4.2 Allowed Binary Split Process
Otherwise, if all of the following conditions are true, allowBtSplit is set equal to FALSE
btSplit is equal to SPLIT_BT_HOR
*cbWidth is greater than 64*
y0+cbHeight is greater than pic_height_in_luma_samples
Otherwise, if all of the following conditions are true, allowBtSplit is set equal to FALSE
x0+cbWidth is greater than pic_width_in_luma_samples
y0+cbHeight is greater than pic_height_in_luma_samples
*cbWidth is greater than minQtSize*
Otherwise, if all of the following conditions are true, allowBtSplit is set equal to FALSE
btSplit is equal to SPLIT_BT_HOR
x0+cbWidth is greater than pic_width_in_luma_samples
y0+cbHeight is less than or equal to pic_height_in_luma_samples The variable allowSplitBtVer is set to be false due to the following conditions (emphases in italics):

6.4.2 Allowed Binary Split Process
Otherwise, if all of the following conditions are true, allowBtSplit is set equal to FALSE
btSplit is equal to SPLIT_BT_VER
y0+cbHeight is greater than pic_height_in_luma_samples
Otherwise, if all of the following conditions are true, allowBtSplit is set equal to FALSE
btSplit is equal to SPLIT_BT_VER
*cbHeight is greater than 64*
x0+cbWidth is greater than pic_width_in_luma_samples The variable allowSplitTtHor and allowSplitTtVer are set to be false due to the following conditions (emphases in italics):

6.4.3 Allowed Ternary Split Process
If one or more of the following conditions are true, allowTtSplit is set equal to FALSE:
cbSize is less than or equal to 2*MinTtSizeY
cbWidth is greater than Min(64, maxTtSize)
cbHeight is greater than Min(64, maxTtSize)
mttDepth is greater than or equal to maxMttDepth
x0+cbWidth is greater than pic_width_in_luma_samples
y0+cbHeight is greater than pic_height_in_luma_samples When all these variables are set to false, the splitting flags at CU level may not be signaled Syntax element split_cu_flag is inferred to be 1, syntax element split_qt_flag is inferred to be 0, syntax element mtt_split_cu_vertical_flag is inferred to 1 and syntax element mtt_split_cu_binary_flag is inferred to 0. In this case, the blocks can be split using SPLIT_TT_VER, which may violate the constraints of VPDUs.

As a second exemplary case in which all the tree splitting modes are disallowed, all the tree splitting are not allowed for a block located at picture boundary and contained samples exceeded the picture boundary. When min QT size is larger than min CU size (syntax element log 2_min_luma_coding_block_size_minus2 in previous tables) and the max BT/TT depth (syntax elements sps_max_mtt_hierarchy_depth_inter_slice, sps_max_mtt_hierarchy_depth_intra_slice_luma, sps_max_mtt_hierarchy_depth_intra_slice_chroma, pic_max_mtt_hierarchy_depth_inter_slice, pic_max_mtt_hierarchy_depth_intra_slice_luma and pic_max_mtt_hierarchy_depth_intra_slice_chroma in previous tables) is equal to 0, all the variables allowSplitQt, allowSplitBtHor, allowSplitBtVer, allowSplitTtHor and allowSplitTtVer are set to false.

Figure 18:
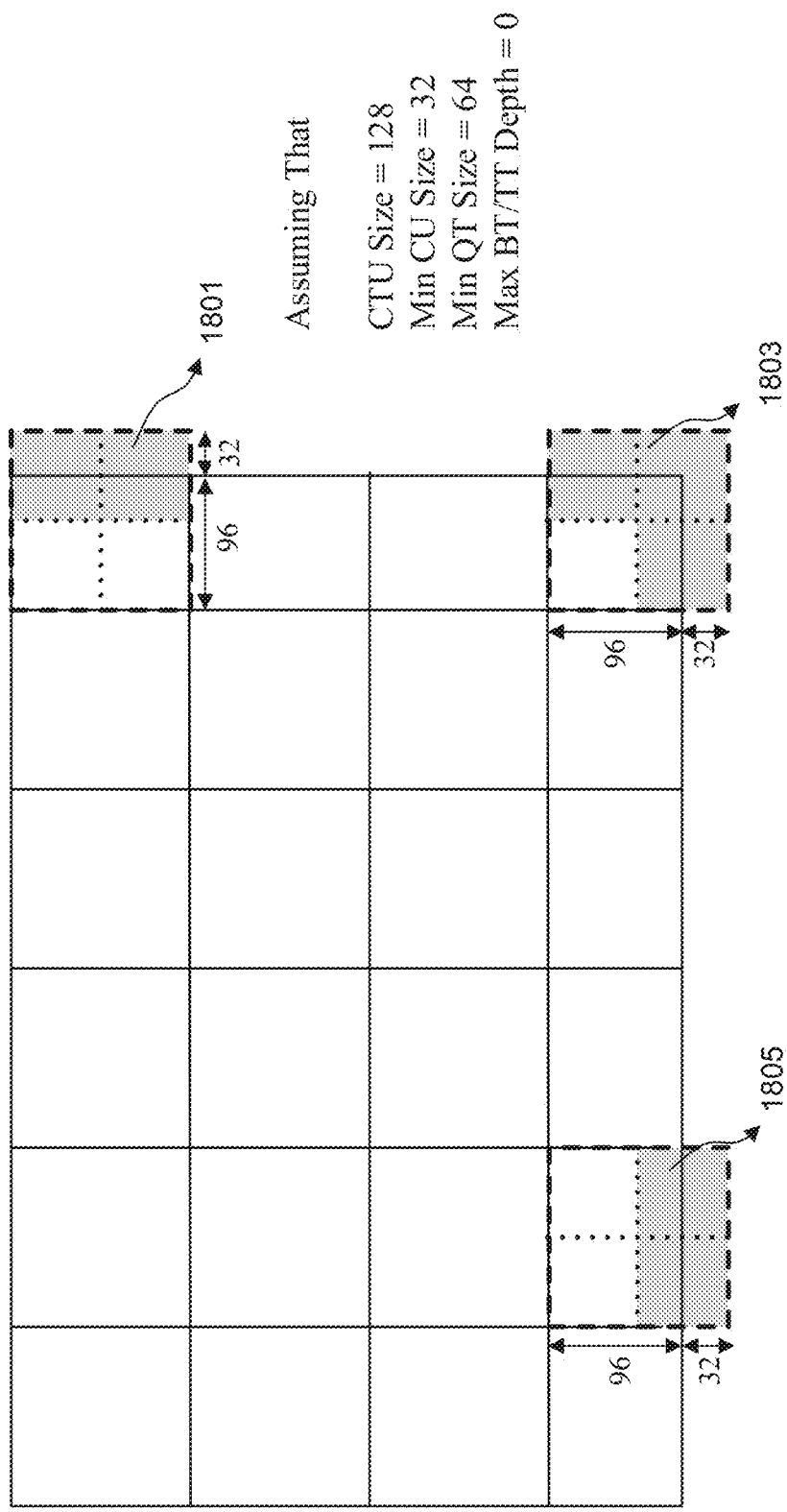
FIG. 18 is a schematic diagram illustrating exemplary blocks of which none of QT, TT, or BT splitting is allowed at picture boundaries, according to some embodiments of the present disclosure.

FIG. 18 illustrates exemplary blocks of which none of QT, BT, or BT splitting is allowed at picture boundaries, according to some embodiments of the present disclosure. The CTU (e.g., CTU 1801, CTU 1803, or CTU 1805) is first split using quad tree splitting into four 64×64 blocks. Then, each of the 64×64 blocks cannot be further split. However, portions of blocks marked in gray exceed the right and/or bottom picture boundary, which are not allowed in VVC design. For the blocks marked in gray, the variable allowSplitQt is set to be false due to the following conditions (emphases in italics):

6.4.1 Allowed Quad Split Process
If one or more of the following conditions are true, allowSplitQt is set equal to FALSE:
treeType is equal to SINGLE_TREE or DUAL_TREE_LUMA and cbSize is less than or equal to *MinQtSizeY*
treeType is equal to DUAL_TREE_CHROMA and cbSize/SubWidthC is less than or equal to *MinQtSizeC*

Figure 19:
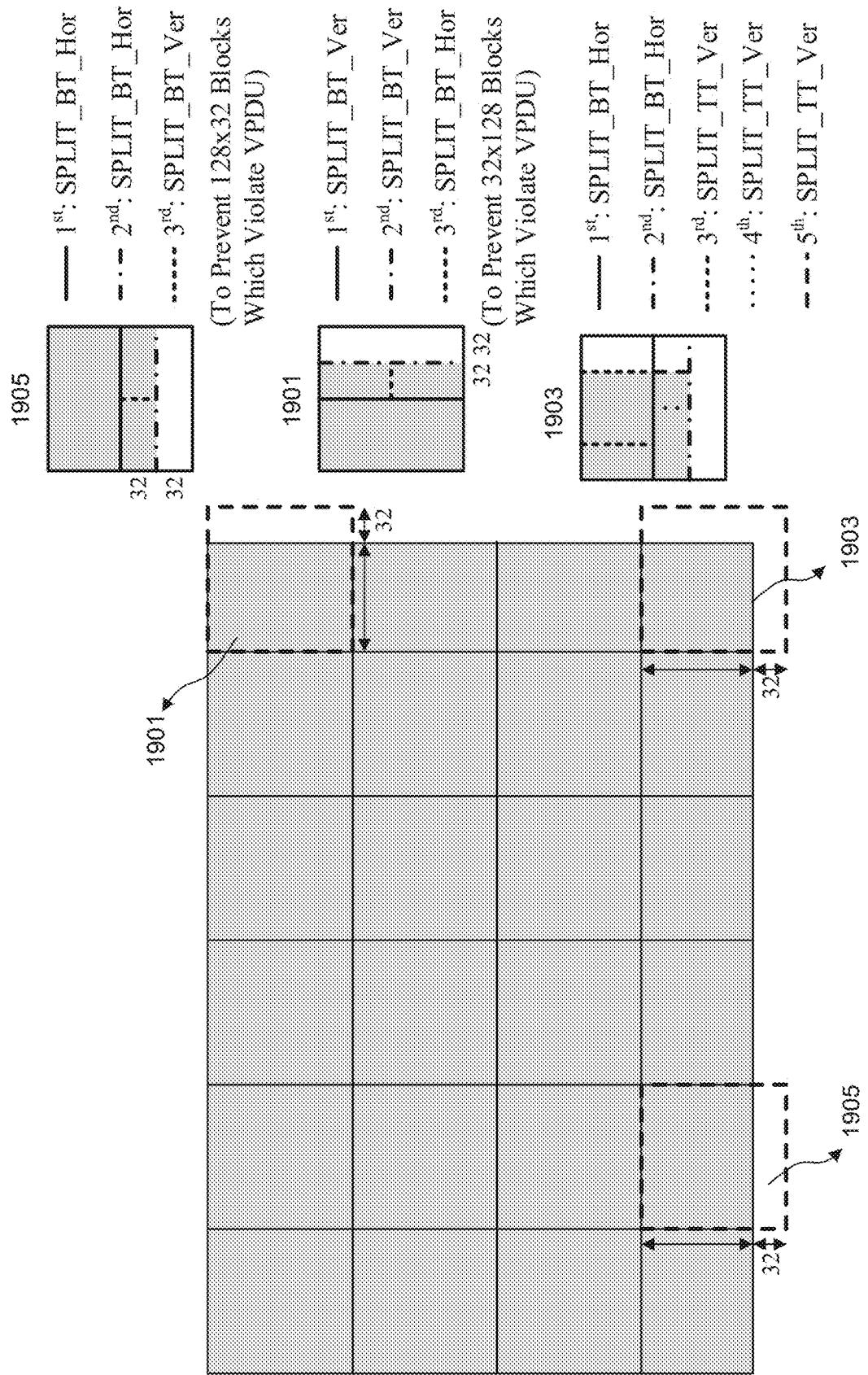
FIG. 19 is a schematic diagram illustrating an example of using BT and TT split, according to some embodiments of the present disclosure.

For the blocks marked in gray, the variables allowSplitBtHor and allowSplitBtVer are set to be false due to the following conditions (emphases in italics):

6.4.2 Allowed Binary Split Process
The variable allowBtSplit is derived as follows:
If one or more of the following conditions are true, allowBtSplit is set equal to FALSE:
cbSize is less than or equal to MinBtSizeY
cbWidth is greater than maxBtSize
cbHeight is greater than maxBtSize
mttDepth is greater than or equal to maxMttDepth For the blocks marked in gray, the variables allowSplitTtHor and allowSplitTtVer are set to be false due to the following conditions (emphases in italics):

6.4.3 Allowed Ternary Split Process
The variable allowTtSplit is derived as follows:
If one or more of the following conditions are true, allowTtSplit is set equal to FALSE:
cbSize is less than or equal to 2*MinTtSizeY
cbWidth is greater than Min(64, maxTtSize)
cbHeight is greater than Min(64, maxTtSize)
mttDepth is greater than or equal to maxMttDepth As described in the first exemplary case in which all the tree splitting modes are disallowed, in current VVC draft 7, CU may contain samples out of a picture boundary but the CU can't be split anymore under some conditions. In some embodiments of the present disclosure, the QT split conditions in VVC can be changed. In an aspect, for a block containing samples out of picture boundary and its width or height equal to N (e.g., N=128), the QT split is used when the min QT size is smaller than N (e.g., 128). In addition, in some embodiments, QT split can also be used when min QT size is equal to N (e.g., 128). In another aspect, using the QT split can be more straightforward than using the BT or TT split. FIG. 19 is a schematic diagram illustrating an example of using BT and TT split, according to some embodiments of the present disclosure. It may require multiple steps to split the block. Besides, the splitting may be different for blocks located at different position, which may be complicated. For example, for block 1903, SPLIT_BT_HOR, SPLIT_BT_HOR, SPLIT_TT_VER, SPLIT_TT_VER, and SPLIT_TT_VER are sequentially performed.

In some embodiments, when none of block partitioning is allowed, quad tree splitting can be used and syntax element split_qt_flag can be inferred to be 1. Syntax element split_qt_flag specifies whether a coding unit is split into coding units with half horizontal and vertical size.

When syntax element split_qt_flag is not present, the following applies (emphases in italics):
If all of the following conditions are true, split_qt_flag is inferred to be equal to 1:
split_cu_flag is equal to 1
allowSplitQt, allowSplitBtHor, allowSplitBtVer, allowSplitTtHor and allowSplitTtVer are equal to FALSE.
Otherwise, If allowSplitQt is equal to TRUE, the value of split_qt_flag is inferred to be equal to 1.
Otherwise, the value of split_qt_flag is inferred to be equal to 0.

In some embodiments, the min QT size constraint can not be applied to a block located at picture boundaries. When a portion of a block exceeds the bottom or right picture boundary, the block can be split using quad tree. The allowed quad split process is described as follows:

6.4.1 Allowed Quad Split Process
Inputs to this process are:
a coding block size cbSize in luma samples,
a multi-type tree depth mttDepth,
a variable treeType specifying whether a single tree (SINGLE_TREE) or a dual tree is used to partition the coding tree node and, when a dual tree is used, whether the luma (DUAL_TREE_LUMA) or chroma components (DUAL_TREE_CHROMA) are currently processed,
a variable modeType specifying whether intra (MODE_INTRA), IBC (MODE_IBC), and inter coding modes can be used (MODE_TYPE_ALL), or whether only intra and IBC coding modes can be used (MODE_TYPE_INTRA), or whether only inter coding modes can be used (MODE_TYPE_INTER) for coding units inside the coding tree node.
Output of this process is the variable allowSplitQt.
The variable allowSplitQt is derived as follows (emphases in italics):
If all of the following conditions are true, allowSplitQt is set equal to true:
treeType is equal to SINGLE_TREE or DUAL_TREE_LUMA
cbSize is equal to 128
MinQtSizeY is equal to 128
x0+cbWidth is greater than pic_width_in_luma_samples or y0+cbHeight is greater than pic_height_in_luma_samples
Otherwise, if all of the following conditions are true, allowSplitQt is set equal to true:
treeType is equal to DUAL_TREE_CHROMA
CbSize/SubWidthC is equal to 128
MinQtSizeC is equal to 128
x0+cbWidth is greater than pic_width_in_luma_samples or y0+cbHeight is greater than pic_height_in_luma_samples
Otherwise, if one or more of the following conditions are true, allowSplitQt is set equal to FALSE:
treeType is equal to SINGLE_TREE or DUAL_TREE_LUMA and cbSize is less than or equal to MinQtSizeY
treeType is equal to DUAL_TREE_CHROMA and cbSize/SubWidthC is less than or equal to MinQtSizeC
mttDepth is not equal to 0
treeType is equal to DUAL_TREE_CHROMA and (cbSize/SubwidthC) is less than or equal to 4
treeType is equal to DUAL_TREE_CHROMA and modeType is equal to MODE_TYPE_INTRA
Otherwise, allowSplitQt is set equal to TRUE.

In some embodiments, bitstream conformance can be added to the syntax of min QT size. It may require that the min QT size needs to be smaller than or equal to 64.

Syntax element sps_log 2_diff_min_qt_min_cb_intra_slice_luma specifies the default difference between the base 2 logarithm of the minimum size in luma samples of a luma leaf block resulting from quadtree splitting of a CTU and the base 2 logarithm of the minimum coding block size in luma samples for luma CUs in slices with slice_type equal to 2 (I) referring to the SPS. When syntax element partition_constraints_override_enabled_flag is equal to 1, the default difference can be overridden by syntax element pic_log 2_diff_min_qt_min_cb_luma present in PHs referring to the SPS. The value of syntax element sps_log 2_diff_min_qt_min_cb_intra_slice_luma is in the range of 0 to CtbLog 2SizeY−MinCbLog 2SizeY, inclusive. The base 2 logarithm of the minimum size in luma samples of a luma leaf block resulting from quadtree splitting of a CTU is derived as follows (emphases in italics):

$$\text{Min } Qt \text{ Log } 2\text{SizeIntra}Y = sps\_\text{log } 2\_diff\_min\_qt\_min\_cb\_intra\_slice\_luma + \text{Min } Cb \text{ Log } 2\text{Size}Y$$

$$V\text{Size} = \text{Min}(64, Ctb\text{Size}Y)$$

In some embodiments, it can be a requirement of bitstream conformance that the value of (1<<MinQtLog 2SizeIntraY) is less than or equal to VSize.

Syntax element sps_log 2_diff_min_qt_min_cb_inter_slice specifies the default difference between the base 2 logarithm of the minimum size in luma samples of a luma leaf block resulting from quadtree splitting of a CTU and the base 2 logarithm of the minimum luma coding block size in luma samples for luma CUs in slices with slice_type equal to 0 (B) or 1 (P) referring to the SPS. When syntax element partition_constraints_override_enabled_flag is equal to 1, the default difference can be overridden by syntax element pic_log 2_diff_min_qt_min_cb_luma present in PHs referring to the SPS. The value of syntax element sps_log 2_diff_min_ qt_min_cb_inter_slice is in the range of 0 to CtbLog 2SizeY−MinCbLog 2SizeY, inclusive. The base 2 logarithm of the minimum size in luma samples of a luma leaf block resulting from quadtree splitting of a CTU is derived as follows (emphases in italics):

Min Qt Log 2SizeInterY=sps_log 2_diff_min_ *qt_min_cb*_inter_slice+Min Cb Log 2SizeY VSize=Min(64,*Ctb*SizeY)

In some embodiments, it can be a requirement of bitstream conformance that the value of (1<<MinQtLog 2SizeInterY) is less than or equal to VSize.

Syntax element sps_log 2_diff_min_qt_min_cb_intra_slice_chroma specifies the default difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in slices with slice_type equal to 2 (I) referring to the SPS. When syntax element partition_constraints_override_enabled_flag is equal to 1, the default difference can be overridden by syntax element pic_log 2_diff_min_qt_min_cb_chroma present in PHs referring to the SPS. The value of syntax element sps_log 2_diff_min_qt_min_cb_intra_slice_chroma is in the range of 0 to CtbLog 2SizeY−MinCbLog 2SizeY, inclusive. When not present, the value of syntax element sps_log 2_diff_min_qt_min_cb_intra_slice_chroma is inferred to be equal to 0. The base 2 logarithm of the minimum size in luma samples of a chroma leaf block resulting from quadtree splitting of a CTU with treeType equal to DUAL_TREE_CHROMA is derived as follows (emphases in italics):

Min Qt Log 2SizeIntraC=sps_log 2_diff_min_ *qt_min_cb*_intra_slice_chroma+Min Cb Log 2SizeY VSize=Min(64,*Ctb*SizeY)

In some embodiments, it can be a requirement of bitstream conformance that the value of (1<<MinQtLog 2SizeIntraC) is less than or equal to VSize.

Syntax element pic_log 2_diff_min_qt_min_cb_intra_slice_luma specifies the difference between the base 2 logarithm of the minimum size in luma samples of a luma leaf block resulting from quadtree splitting of a CTU and the base 2 logarithm of the minimum coding block size in luma samples for luma CUs in the slices with slice_type equal to 2 (I) associated with the PH. The value of syntax element pic_log 2_diff_min_qt_min_cb_intra_slice_luma is in the range of 0 to CtbLog 2SizeY−MinCbLog 2SizeY, inclusive. When not present, the value of syntax element pic_log 2_diff_min_qt_min_cb_luma is inferred to be equal to syntax element sps_log 2_diff_min_qt_min_cb_intra_slice_luma. In some embodiments, it can be a requirement of bitstream conformance that the value of (1<<(pic_log 2_diff_min_qt_min_cb_intra_slice_luma+MinCbLog 2SizeY)) is less than or equal to Min(64, CtbSizeY).

Syntax element pic_log 2_diff_min_qt_min_cb_inter_slice specifies the difference between the base 2 logarithm of the minimum size in luma samples of a luma leaf block resulting from quadtree splitting of a CTU and the base 2 logarithm of the minimum luma coding block size in luma samples for luma CUs in the slices with slice_type equal to 0 (B) or 1 (P) associated with the PH. The value of syntax element pic_log 2_diff_min_ qt_min_cb_inter_slice is in the range of 0 to CtbLog 2SizeY−MinCbLog 2SizeY, inclusive. When not present, the value of syntax element pic_log 2_diff_min_ qt_min_cb_luma is inferred to be equal to syntax element sps_log 2_diff_min_qt_min_cb_inter_slice. In some embodiments, it can be a requirement of bitstream conformance that the value of (1<<(pic_log 2_diff_min_ qt_min_cb_inter_slice+MinCbLog 2SizeY)) is less than or equal to Min(64, CtbSizeY).

Syntax element pic_log 2_diff_min_qt_min_cb_intra_slice_chroma specifies the difference between the base 2 logarithm of the minimum size in lama samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in slices with slice_type equal to 2 (I) associated with the PH. The value of syntax element pic_log 2_diff_min_qt_min_cb_intra_slice_chroma is in the range of 0 to CtbLog 2SizeY−MinCbLog 2SizeY, inclusive. When not present, the value of syntax element pic_log 2_diff_min_qt_min_cb_intra_slice_chroma is inferred to be equal to syntax element sps_log 2_diff_min_qt_min_cb_intra_slice_chroma. In some embodiments, it can be a requirement of bitstream conformance that the value of (1<< (pic_log 2_diff_min_qt_cb_intra_slice_chroma+MinCbLog 2SizeY)) is less than or equal to Min(64, CtbSizeY).

In some embodiments, when none of block partitioning is allowed in the above second exemplary case in which all the tree splitting modes are disallowed, quad tree splitting can be used and syntax element split_qt_flag can be inferred to be 1.

Syntax element split_qt_flag specifies whether a coding unit is split into coding units with half horizontal and vertical size When syntax element split_qt_flag is not present, the following applies (emphases in italics):

If all of the following conditions are true, split_qt_flag is inferred to be equal to 1:
  split_cu_flag is equal to 1
  allowSplitQt, allowSplitBtHor, allowSplitBtVer, allow SplitTtHor and allow SplitTtVer are equal to FALSE.
Otherwise, If allowSplitQt is equal to TRUE, the value of split_qt_flag is inferred to be equal to 1.
Otherwise, the value of split_qt_flag is inferred to be equal to 0.

In some embodiments, in the above second exemplary case in which all the tree splitting modes are disallowed, bitstream conformance can be added to the syntax of min QT size and max BT/TT depth.

Syntax element sps_log 2_diff_min_qt_min_cb_intra_slice_luma specifies the default difference between the base 2 logarithm of the minimum size in luma samples of a luma leaf block resulting from quadtree splitting of a CTU and the base 2 logarithm of the minimum coding block size in luma samples for luma CUs in slices with slice_type equal to 2 (I) referring to the SPS. When syntax element partition_constraints_override_enabled_flag is equal to 1, the default difference can be overridden by syntax element pic_log 2_diff_min_qt_min_cb_luma present in PHs referring to the SPS. The value of syntax element sps_log 2_diff_min_qt_min_cb_intra_slice_luma is in the range of 0 to CtbLog 2SizeY−MinCbLog 2SizeY, inclusive. The base 2 logarithm of the minimum size in luma samples of a luma leaf block resulting from quadtree splitting of a CTU is derived as follows:

Min Qt Log 2SizeIntraY=sps_log 2_diff_min_ *qt_min_cb*_ultra_slice_luma+MinCb Log 2SizeY Syntax element sps_max_mtt_hierarchy_depth_intra_slice_luma specifies the default maximum hierarchy depth for coding units resulting from multi-type tree splitting of a quadtree leaf in slices with slice_type equal to 2 (I) referring to the SPS. When syntax element partition_constraints_override_enabled_flag is equal to 1, the default maximum hierarchy depth can be overridden by syntax element pic_max_mtt_hierarchy_depth_intra_slice_luma present in PHs referring to the SPS. The value of syntax element sps_max_mtt_hierarchy_depth_intra_slice_luma is in the range of 0 to 2*(CtbLog 2SizeY−MinCbLog 2SizeY), inclusive. In some embodiments, it can be a requirement of bitstream conformance that the value of (MinQtLog 2SizeIntraY−sps_max_mtt_hierachy_depth_intra_slice_luma/2) is less than or equal to MinCbLog 2SizeY.

Syntax element sps_log 2_diff_min_qt_min_cb_inter_slice specifies the default difference between the base 2 logarithm of the minimum size in luma samples of a luma leaf block resulting from quadtree splitting of a CTU and the base 2 logarithm of the minimum luma coding block size in luma samples for luma CUs in slices with slice_type equal to 0 (B) or 1 (P) referring to the SPS. When syntax element partition constraints override enabled flag is equal to 1, the default difference can be overridden by syntax element pic_log 2_diff_min_qt_min_cb_luma present in PHs referring to the SPS. The value of syntax element sps_log 2_diff_min_qt_min_cb_inter_slice is in the range of 0 to CtbLog 2SizeY−MinCbLog 2SizeY, inclusive. The base 2 logarithm of the minimum size in luma samples of a luma leaf block resulting from quadtree splitting of a CTU is derived as follows:

Min Qt Log 2SizeInterY=sps_log 2_diff_min_qt_min_cb_inter_slice+Min Cb Log 2SizeY Syntax element sps_max_mtt_hierarchy_depth_inter_slice specifies the default maximum hierarchy depth for coding units resulting from multi-type tree splitting of a quadtree leaf in slices with slice_type equal to 0 (B) or 1 (P) referring to the SPS. When syntax element partition_constraints_override_enabled_flag is equal to 1, the default maximum hierarchy depth can be overridden by syntax element pic_max_mtt_hierarchy_depth_inter_slice present in PHs referring to the SPS. The value of syntax element sps_max_mtt_hierarchy_depth_inter_slice is in the range of 0 to 2*(CtbLog 2SizeY−MinCbLog 2SizeY), inclusive. In some embodiments, it can be a requirement of bitstream conformance that the value of (MinQtLog 2SizeInterY−sps_max_mtt_hieraghy_depth_inter_slice/2) is less than or equal to MinCbLog 2SizeY.

Syntax element sps_log 2_diff_min_qt_min_cb_intra_slice_chroma specifies the default difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in slices with slice_type equal to 2 (I) referring to the SPS. When syntax element partition_constraints_override_enabled_flag is equal to 1, the default difference can be overridden by syntax element pic_log 2_diff_min_qt_min_cb_chroma present in PHs referring to the SPS. The value of syntax element sps_log 2_diff_min_qt_min_cb_intra_slice_chroma is in the range of 0 to CtbLog 2SizeY−MinCbLog 2SizeY, inclusive. When not present, the value of syntax element sps_log 2_diff_min_qt_min_cb_intra_slice_chroma is inferred to be equal to 0. The base 2 logarithm of the minimum size in luma samples of a chroma leaf block resulting from quadtree splitting of a CTU with treeType equal to DUAL_TREE_CHROMA is derived as follows:

Min Qt Log 2SizeIntraC=sps_log 2_diff_min_qt_min_cb_intra_slice_chroma+Min Cb Log 2SizeY Syntax element sps_max_mtt_hierarchy_depth_intra_slice_chroma specifies the default maximum hierarchy depth for chroma coding units resulting from multi-type tree splitting of a chroma quadtree leaf with treeType equal to DUAL_TREE_CHROMA in slices with slice_type equal to 2 (I) referring to the SPS. When syntax element partition_constraints_override_enabled_flag is equal to 1, the default maximum hierarchy depth can be overridden by syntax element pic_max_mtt_hierarchy_depth_chroma present in PHs referring to the SPS. The value of syntax element sps_max_mtt_hierarchy_depth_intra_slice_chroma is in the range of 0 to 2*(CtbLog 2SizeY−MinCbLog 2SizeY), inclusive. When not present, the value of syntax element sps_max_mtt_hierarchy_depth_intra_slice_chroma is inferred to be equal to 0. In some embodiments, it can be a requirement of bitstream conformance that the value of (MinQtLog 2SizeIntraC−sps_max_mtt_hieracky_depth_intra_slice_chroma/2) is less than or equal to MinCbLog 2SizeY.

Syntax element pic_log 2_diff_min_qt_min_cb_intra_slice_luma specifies the difference between the base 2 logarithm of the minimum size in luma samples of a luma leaf block resulting from quadtree splitting of a CTU and the base 2 logarithm of the minimum coding block size in luma samples for luma CUs in the slices with slice_type equal to 2 (I) associated with the PH. The value of syntax element pic_log 2_diff_min_qt_min_cb_intra_slice_luma is in the range of 0 to CtbLog 2SizeY−MinCbLog 2SizeY, inclusive. When not present, the value of syntax element pic_log 2_diff_min_qt_min_cb_luma is inferred to be equal to syntax element sps_log 2_diff_min_qt_min_cb_intra_slice_luma.

Syntax element pic_max_mtt_hierarchy_depth_intra_slice_luma specifies the maximum hierarchy depth for coding units resulting from multi-type tree splitting of a quadtree leaf in slices with slice_type equal to 2 (I) associated with the PH. The value of syntax element pic_max_mtt_hierarchy_depth_intra_slice_luma is in the range of 0 to 2*(CtbLog 2SizeY−MinCbLog 2SizeY), inclusive. When not present, the value of syntax element pic_max_mtt_hierarchy_depth_intra_slice_luma is inferred to be equal to syntax element sps_max_mtt_hierarchy_depth_intra_slice_luma. In some embodiments, it can be a requirement of bitstream conformance that the value of (pic_log 2_diff_min_qt_min_cb_intra_slice_luma+MinCbLog 2SizeY−pic_max_mtt_hierarchy_depth_intra_slice_luma/2) is less than or equal to MinCbLog 2SizeY.

Syntax element pic_log 2_diff_min_qt_min_cb_inter_slice specifies the difference between the base 2 logarithm of the minimum size in luma samples of a luma leaf block resulting from quadtree splitting of a CTU and the base 2 logarithm of the minimum luma coding block size in luma samples for luma CUs in the slices with slice_type equal to 0 (B) or 1 (P) associated with the PH. The value of syntax element pic_log 2_diff_min_qt_min_cb_inter_slice is in the range of 0 to CtbLog 2SizeY−MinCbLog 2SizeY, inclusive. When not present, the value of syntax element pic_log 2_diff_min_ qt_min_cb_luma is inferred to be equal to syntax element sps_log 2_diff_min_qt_min_cb_inter_slice.

Syntax element pic_max_mtt_hierarchy_depth_inter_slice specifies the maximum hierarchy depth for coding units resulting from multi-type tree splitting of a quadtree leaf in slices with slice_type equal to 0 (B) or 1 (P) associated with the PH. The value of syntax element pic_max_mtt_hierarchy_depth_inter_slice is in the range of 0 to 2*(CtbLog 2SizeY−MinCbLog 2SizeY), inclusive. When not present, the value of syntax element pic_max_mtt_hierarchy_depth_inter_slice is inferred to be equal to syntax element sps_max_mtt_hierarchy_depth_inter_slice. In some embodiments, it can be a requirement of bitstream conformance that the value of (pic_log 2_diff_min_qt_min_cb_inter_slice+MinCbLog 2SizeY−pic_max_mtt_hierarchy_depth_inter_slice/2) is less than or equal to MinCbLog 2SizeY.

Syntax element pic_log 2_diff_min_qt_min_cb_intra_slice_chroma specifies the difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in slices with slice_type equal to 2 (I) associated with the PH. The value of syntax element pic_log 2_diff_min_qt_min_cb_intra_slice_chroma is in the range of 0 to CtbLog 2SizeY−MinCbLog 2SizeY, inclusive. When not present, the value of syntax element pic_log 2_diff_min_qt_min_cb_intra_slice_chroma is inferred to be equal to syntax element sps_log 2_diff_min_qt_min_cb_intra_slice_chroma.

Syntax element pic_max_mtt_hierarchy_depth_intra_slice_chroma specifies the maximum hierarchy depth for chroma coding units resulting from multi-type tree splitting of a chroma quadtree leaf with treeType equal to DUAL_TREE_CHROMA in slices with slice_type equal to 2 (I) associated with the PH. The value of syntax element pic_max_mtt_hierarchy_depth_intra_slice_chroma is in the range of 0 to 2*(CtbLog 2SizeY−MinCbLog 2SizeY), inclusive. When not present, the value of syntax element pic_max_mtt_hierarchy_depth_intra_slice_chroma is inferred to be equal to syntax element sps_max_mtt_hierarchy_depth_intra_slice_chroma. In some embodiments, it can be a requirement of bitstream conformance that the value of (pic_log 2_diff_min_qt_min_cb_intra_slice_chroma+MinCbLog 2SizeY−pic_max_mtt_hierarchy_depth_intra_slice_chroma/2) is less than or equal to MinCbLog 2SizeY.

FIG. 20 illustrates a flowchart of an exemplary video processing method 2000, according to some embodiments of the present disclosure. Method 2000 can be performed by an encoder (e.g., by process 200A of FIG. 2A or 200B of FIG. 2B), a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform method 2000. In some embodiments, method 2000 can be implemented by a computer program product, embodied in a computer-readable medium, including computer-executable instructions, such as program code, executed by computers (e.g., apparatus 400 of FIG. 4).

At step 2001, a determination can be made on whether a coding block includes samples outside a picture boundary In some embodiments, the picture boundary can be a bottom picture boundary or a right picture boundary. As an example for coding blocks including samples outside a picture boundary, with reference to FIG. 17, coding block 1701 exceeds the right picture boundary of picture 1700, coding block 1705 exceeds the bottom picture boundary of picture 1700, and coding block 1703 exceeds both the bottom and right picture boundaries of picture 1700.

At step 2003, in response to the coding block being determined to include samples outside a picture boundary, the coding block can be split using a QT mode. In some embodiments, in response to the coding block being determined to include samples outside a picture boundary, method 2000 can determine that BT mode and TT mode are not allowed to be used to split the coding block. For example, variables allowSplitBtHor, allowSplitBtVer, allowSplitTtHor and allowSplitTtVer can be determined to be equal to FALSE.

In some embodiments, in response to the coding block being determined to include samples outside a picture boundary, method 2000 can determine that the coding block is to be split using the QT mode, regardless of whether a QT flag is present in a bitstream that comprises the coding block. The QT flag indicates whether the coding block is to be split using the QT mode. For example, when syntax element split_qt_flag is not present, the value of split_qt_flag can be inferred to be equal to 1 if the coding block comprises samples outside a picture boundary and variables allowSplitQt, allowSplitBtHor, allowSplitBtVer, allowSplitTtHor and allowSplitTtVer are equal to FALSE or allowSplitQt is equal to TRUE.

In some embodiments, in response to the coding block being determined to comprise samples outside a picture boundary, method 2000 can determine that the QT mode is allowed to be used to split the coding block, regardless of a preset constraint on a minimum block size to which the QT mode is allowed to be applied. For example, the min QT size constraint can be not applied to the coding block located at picture boundary.

In some embodiments, the preset constraint can include a bitstream conformance to the coding block. The bitstream conformance can set a minimum block size to which the QT mode is allowed to be applied. For example, the minimum block size can be set to be smaller than or equal to 64. The bitstream conformance can also set a maximum BT depth or a maximum TT depth.

In some embodiments, method 2000 can include determining that the coding block is to be split. For example, syntax element split_cu_flag can be used to indicate whether the coding block is to be split. When syntax element split_cu_flag is not present, it can be inferred to be equal to 1 which indicates that the coding block is to be split.

It is appreciated that an embodiments of the present disclosure can be combined with another embodiments or some other embodiments.

The embodiments may further be described using the following clauses:

1. A video processing method, comprising:
determining whether a coding block comprises samples outside a picture boundary; and
in response to the coding block being determined to comprise samples outside a picture boundary, performing quad tree splitting of the coding block regardless of a value of a first parameter, wherein the first parameter indicates whether the quad tree is allowed to be used to split the coding block.

2. The method of clause 1, further comprising:
determining a value of a first flag of the coding block, the first flag indicating whether the coding block is split into a plurality of subblocks; and determining values of a second, a third, a fourth, and a fifth parameters of the coding block, the second, third, fourth, and fifth parameters respectively indicating whether binary horizontal tree, binary vertical tree, ternary horizontal tree, and ternary vertical tree are allowed to be used to split the coding block.

3. The method of clause 2, further comprising:
in response to the value of the first flag being equal to 1, and the values of the first, the second, the third, the fourth, and the fifth parameters being equal to 0, setting a value of a second flag of the coding block to 1, the second flag indicating whether the coding block is split using the quad tree.

4. The method of clause 2, further comprising:
in response to the value of the first parameter being equal to 1, setting a value of a second flag of the coding block to 1, the second flag indicating whether the coding block is split, using the quad tree.

5. The method of any one of clauses 2-4, further comprising:
setting the value of the first flag to be 1, when the coding block is determined to comprise samples outside of a picture boundary.

6. A video processing apparatus, comprising:
at least one memory for storing instructions; and
at least one processor configured to execute the instructions to cause the apparatus to perform:
determining whether a coding block comprises samples outside a picture boundary; and
in response to the coding block being determined to comprise samples outside a picture boundary, performing quad tree splitting of the coding block regardless of a value of a first parameter, wherein the first parameter indicates whether the quad tree is allowed to be used to split the coding block.

7. The apparatus of clause 6, wherein the at least one processor is configured to execute the instructions to cause the apparatus to perform:
determining a value of a first flag of the coding block, the first flag indicating whether the coding block is split into a plurality of subblocks; and
determining values of a second, a third, a fourth, and a fifth parameters of the coding block, the second, third, fourth, and fifth parameters respectively indicating whether binary horizontal tree, binary vertical tree, ternary horizontal tree, and ternary vertical tree are allowed to be used to split the coding block.

8. The apparatus of clause 7, wherein the at least one processor is configured to execute the instructions to cause the apparatus to perform:
in response to the value of the first flag being equal to 1, and the values of the first, the second, the third, the fourth, and the fifth parameters being equal to 0, setting a value of a second flag of the coding block to 1, the second flag indicating whether the coding block is split using the quad tree.

9. The apparatus of clause 7, wherein the at least one processor is configured to execute the instructions to cause the apparatus to perform:
in response to the value of the first parameter being equal to 1, setting a value of a second flag of the coding block to 1, the second flag indicating whether the coding block is split using the quad tree.

10. The apparatus of any one of clauses 7-9, wherein the at least one processor is configured to execute the instructions to cause the apparatus to perform:
setting the value of the first flag to be 1, when the coding block is determined to comprise samples outside of a picture boundary.

11. A non-transitory computer readable storage medium storing a set of instructions that are executable by one or more processing devices to cause a video processing apparatus to perform:
determining whether a coding block comprises samples outside a picture boundary; and
in response to the coding block being determined to comprise samples outside a picture boundary, performing quad tree splitting of the coding block regardless of a value of a first parameter, wherein the first parameter indicates whether the quad tree is allowed to be used to split the coding block.

12. The non-transitory computer readable storage medium of clause 11, wherein the set of instructions are executable by the one or more processing devices to cause the video processing apparatus to perform:
determining a value of a first flag of the coding block, the first flag indicating whether the coding block is split into a plurality of subblocks; and
determining values of a second, a third, a fourth, and a fifth parameters of the coding block, the second, third, fourth, and fifth parameters respectively indicating whether binary horizontal tree, binary vertical tree, ternary horizontal tree, and ternary vertical tree are allowed to be used to split the coding block.

13. The non-transitory computer readable storage medium clause 12, wherein the set of instructions are executable by the one or more processing devices to cause the video processing apparatus to perform:
in response to the value of the first flag being equal to 1, and the values of the first, the second, the third, the fourth, and the fifth parameters being equal to 0, setting a value of a second flag of the coding block to 1, the second flag indicating whether the coding block is split using the quad tree.

14. The non-transitory computer readable storage medium of clause 12, wherein the set of instructions are executable by the one or more processing devices to cause the video processing apparatus to perform:
in response to the value of the first parameter being equal to 1, setting a value of a second flag of the coding block to 1, the second flag indicating whether the coding block is split, using the quad tree.

15. The non-transitory computer readable storage medium of any one of clauses 12-14, wherein in response to the coding block being determined to comprise samples outside a picture boundary, splitting the coding block using the QT mode comprises:
setting the value of the first flag to be 1, when the coding block is determined to comprise samples outside of a picture boundary.

16. A video processing method, comprising:
determining whether a coding block comprises samples outside a picture boundary;
in response to the coding block being determined to comprise samples outside a picture boundary, splitting the coding block using a quad tree (QT) mode.

17. The method of clause 16, further comprising:
in response to the coding block being determined to comprise samples outside a picture boundary, determining that binary tree (BT) mode and ternary tree (TT) mode are not allowed to be used to split the coding block.

18. The method of any one of clauses 16 and 17, wherein in response to the coding block being determined to comprise samples outside a picture boundary, splitting the coding block using a quad tree (QT) mode comprises:

splitting the coding block using the QT mode, regardless of whether a QT flag is present in a bitstream that comprises the coding block, the QT flag indicating whether the coding block is to be split using the QT mode.

19. The method of clause 16, wherein in response to the coding block being determined to comprise samples outside a picture boundary, splitting the coding block using a quad tree (QT) mode comprises:

splitting the coding block using the QT mode, regardless of a preset constraint on a minimum block size to which the QT mode is allowed to be applied.

20. The method of clause 19, wherein:

the preset constraint comprises a bitstream conformance associated with the coding block, the bitstream conformance setting a minimum block size to which the QT mode is allowed to be applied.

21. The method of clause 20, wherein the minimum block size is set to be smaller than or equal to 64.

22. The method of any one of clauses 20 and 21, wherein the bitstream conformance sets a maximum BT depth or a maximum TT depth.

23. The method of any one of clauses 16-22, wherein the picture boundary is a bottom picture boundary or a right picture boundary.

24. A video processing apparatus, comprising:

at least one memory for storing instructions; and at least one processor configured to execute the instructions to cause the apparatus to perform:

determining whether a coding block comprises samples outside a picture boundary;

in response to the coding block being determined to comprise samples outside a picture boundary, splitting the coding block using a quad tree (QT) mode.

25. The apparatus of clause 24, wherein the at least one processor is configured to execute the instructions to cause the apparatus to perform:

in response to the coding block being determined to comprise samples outside a picture boundary, determining that binary tree (BT) mode and ternary tree (TT) mode are not allowed to be used to split the coding block.

26. The apparatus of any one of clauses 24 and 25, wherein the at least one processor is configured to execute the instructions to cause the apparatus to perform:

splitting the coding block using the QT mode, regardless of whether a QT flag is present in a bitstream that comprises the coding block, the QT flag indicating whether the coding block is to be split using the QT mode.

27. The apparatus of clause 24, wherein the at least one processor is configured to execute the instructions to cause the apparatus to perform:

splitting the coding block using the QT mode, regardless of a preset constraint on a minimum block size to which the QT mode is allowed to be applied.

28. The apparatus of clause 27, wherein preset constraint comprises a bitstream conformance associated with the coding block, the bitstream conformance setting a minimum block size to which the QT mode is allowed to be applied.

29. The apparatus of clause 28, wherein the minimum block size is set to be smaller than or equal to 64.

30. The apparatus of any one of clauses 28 and 29, wherein the bitstream conformance sets a maximum BT depth or a maximum TT depth.

31. The apparatus of any one of clauses 24-30, wherein the picture boundary is a bottom picture boundary or a right picture boundary.

32. A non-transitory computer readable storage medium storing a set of instructions that are executable by one or more processing devices to cause a video processing apparatus to perform:

determining whether a coding block comprises samples outside a picture boundary;

in response to the coding block being determined to comprise samples outside a picture boundary, splitting the coding block using a quad tree (QT) mode.

33. The non-transitory computer readable storage medium of clause 32, wherein the set of instructions are executable by the one or more processing devices to cause the video processing apparatus to perform:

in response to the coding block being determined to comprise samples outside a picture boundary, determining that binary tree (BT) mode and ternary tree (TT) mode are not allowed to be used to split the coding block.

34. The non-transitory computer readable storage medium of any one of clauses 32 and 33, wherein the set of instructions are executable by the one or more processing devices to cause the video processing apparatus to perform:

splitting the coding block using the QT mode, regardless of whether a QT flag is present in a bitstream that comprises the coding block, the QT flag indicating whether the coding block is to be split using the QT mode.

35. The non-transitory computer readable storage medium of clause 32, wherein the set of instructions are executable by the one or more processing devices to cause the video processing apparatus to perform:

splitting the coding block using the QT mode, regardless of a preset constraint on a minimum block size to which the QT mode is allowed to be applied.

36. The non-transitory computer readable storage medium of clause 35, wherein:

the preset constraint comprises a bitstream conformance associated with the coding block, the bitstream conformance setting a minimum block size to which the QT mode is allowed to be applied.

37. The non-transitory computer readable storage medium of clause 36, wherein the minimum block size is set to be smaller than or equal to 64.

38. The non-transitory computer readable storage medium of any one of clauses 36 and 37, wherein the bitstream conformance sets a maximum BT depth or a maximum TT depth.

39. The non-transitory computer readable storage medium of any one of clauses 32-38, wherein the picture boundary is a bottom picture boundary or a right picture boundary.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C. or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A video processing method implemented in a decoder, comprising:
   determining whether a coding block comprises samples outside a picture boundary;
   in response to the coding block being determined to comprise samples outside a picture boundary, performing quad tree splitting of the coding block comprising:
   determining a value of a first flag of the coding block, the first flag indicating whether the coding block is split into a plurality of subblocks;
   determining values of a first, a second, a third, a fourth, and a fifth parameter of the coding block, the parameters respectively indicating whether quad tree, binary horizontal tree, binary vertical tree, ternary horizontal tree, and ternary vertical tree are allowed to be used to split the coding block; and
   in response to the value of the first flag being equal to 1 and the values of the first, the second, the third, the fourth, and the fifth parameters being equal to 0, determining a value of a second flag of the coding block to be equal to 1, the second flag indicating whether to perform quad tree splitting of the coding block.

2. The method of claim 1, further comprising:
   in response to the value of the first parameter being equal to 1, determining the value of the second flag of the coding block to be equal to 1.

3. The method of claim 1, further comprising:
   setting the value of the first flag to be 1, when the coding block is determined to comprise samples outside of a picture boundary.

4. The method of claim 1, further comprising:
   determining the value of the first parameter based on one or more of:
   a size of the coding block,
   a multi-type tree depth,
   a sixth parameter indicating whether a single tree or a dual tree is used to split the coding block, or
   a seventh parameter indicating whether one or more of an intra mode, an inter mode, and an intra block copy (IBC) mode are allowed to code the coding block.

5. The method of claim 1, wherein in response to the coding block being determined to comprise samples outside a picture boundary, performing quad tree splitting of the coding block comprises:
   performing quad tree splitting of the coding block, regardless of a bitstream conformance associated with the coding block.

6. The method of claim 5, wherein the bitstream conformance sets a minimum block size to which the quad tree splitting is allowed to be applied.

7. The method of claim 6, wherein the minimum block size is set to be smaller than or equal to 64.

8. The method of claim 5, wherein the bitstream conformance sets a maximum binary tree depth or a maximum ternary tree depth.

9. A video processing apparatus implemented in an encoder, comprising:
   at least one memory for storing instructions; and
   at least one processor configured to execute the instructions to cause the apparatus to perform:
   determining whether a coding block comprises samples outside a picture boundary;
   in response to the coding block being determined to comprise samples outside a picture boundary, performing quad tree splitting of the coding block comprising:
   determining a value of a first flag of the coding block, the first flag indicating whether the coding block is split into a plurality of subblocks;
   determining values of a first, a second, a third, a fourth, and a fifth parameter of the coding block, the parameters respectively indicating whether quad tree, binary horizontal tree, binary vertical tree, ternary horizontal tree, and ternary vertical tree are allowed to be used to split the coding block; and in response to the value of the first flag being equal to 1 and the values of the first, the second, the third, the fourth, and the fifth parameters being equal to 0, determining a value of a second flag of the coding block to be equal to 1, the second flag indicating whether to perform quad tree splitting of the coding block.

10. The apparatus of claim 9, wherein the at least one processor is configured to execute the instructions to cause the apparatus to perform:
in response to the value of the first parameter being equal to 1, determining the value of the second flag of the coding block to be equal to 1.

11. The apparatus of claim 9, wherein the at least one processor is configured to execute the instructions to cause the apparatus to perform:
setting the value of the first flag to be 1, when the coding block is determined to comprise samples outside of a picture boundary.

12. A non-transitory computer readable storage medium storing a bitstream of a video for processing according to a method comprising:
determining whether a coding block of the bitstream comprises samples outside a picture boundary;
in response to the coding block being determined to comprise samples outside a picture boundary, performing quad tree splitting of the coding block comprising:
determining a value of a first flag of the coding block, the first flag indicating whether the coding block is split into a plurality of subblocks;
determining values of a first, a second, a third, a fourth, and a fifth parameter of the coding block, the parameters respectively indicating whether quad tree, binary horizontal tree, binary vertical tree, ternary horizontal tree, and ternary vertical tree are allowed to be used to split the coding block; and
in response to the value of the first flag being equal to 1 and the values of the first, the second, the third, the fourth, and the fifth parameters being equal to 0, determining a value of a second flag of the coding block to be equal to 1, the second flag indicating whether to perform quad tree splitting of the coding block.

13. The non-transitory computer readable storage medium of claim 12, wherein the set of instructions are executable by the one or more processing devices to cause the video processing apparatus to perform:
in response to the value of the first parameter being equal to 1, determining the value of the second flag of the coding block to be equal to 1.

14. The non-transitory computer readable storage medium of claim 12, wherein the set of instructions that are executable by the one or more processing devices to cause the video processing apparatus to further perform:
setting the value of the first flag to be 1, when the coding block is determined to comprise samples outside of a picture boundary.

* * * * *